(12) United States Patent
Maehiro et al.

(10) Patent No.: US 7,574,678 B2
(45) Date of Patent: Aug. 11, 2009

(54) POINTER MOVEMENT DISPLAY FOR SELECTING DESIRED AVAILABLE OBJECT

(75) Inventors: Kazutoyo Maehiro, Tokyo (JP); Mitsutera Fukushima, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 622 days.

(21) Appl. No.: 11/420,155

(22) Filed: May 24, 2006

(65) Prior Publication Data

US 2006/0277503 A1    Dec. 7, 2006

(30) Foreign Application Priority Data

May 25, 2005    (JP)    ............ P2005-153125

(51) Int. Cl.
*G06F 3/048*    (2006.01)
*G06F 3/033*    (2006.01)

(52) U.S. Cl. ............ 715/856; 715/857; 715/858; 715/860; 345/157

(58) Field of Classification Search ......... 715/855–860, 715/762–765, 804–805, 818; 345/157, 163
See application file for complete search history.

(56) References Cited

U.S. PATENT DOCUMENTS

| | | | | |
|---|---|---|---|---|
| 5,510,811 A | * | 4/1996 | Tobey et al. ............... | 345/157 |
| 5,673,401 A | * | 9/1997 | Volk et al. .................. | 725/139 |
| 5,850,212 A | * | 12/1998 | Nishibori .................... | 345/160 |
| 5,856,827 A | | 1/1999 | Sudo | |
| 6,025,833 A | * | 2/2000 | Duff .......................... | 345/159 |
| 6,266,043 B1 | * | 7/2001 | Robin ........................ | 715/858 |
| 6,614,455 B1 | * | 9/2003 | Cuijpers et al. ............. | 715/810 |
| 6,995,746 B2 | * | 2/2006 | Aymeric ..................... | 345/156 |
| 7,062,717 B2 | * | 6/2006 | Scott .......................... | 715/767 |
| 2003/0020766 A1 | | 1/2003 | Maehiro | |
| 2003/0034964 A1 | | 2/2003 | Yoshioka | |
| 2003/0043198 A1 | | 3/2003 | Delpuch | |
| 2005/0192096 A1 | | 9/2005 | Maehiro | |

FOREIGN PATENT DOCUMENTS

EP    1677495    7/2006

(Continued)

OTHER PUBLICATIONS

English Language abstract of JP6-131119.

(Continued)

*Primary Examiner*—Tadeese Hailu
(74) *Attorney, Agent, or Firm*—Greenblum & Bernstein P.L.C.

(57) ABSTRACT

A right link of each button to be displayed on a display device is set in such a way that the position of an anchor moves through all the buttons from the left to the right. In response to an initial input of the right direction key, the position of the anchor moves from the button currently pointed to by the anchor to a button of the right link destination. In response to a continuous input of the right direction key, the position of the anchor moves to the button of the right link destination when one of buttons other than a button at the right end is currently pointed to by the anchor, but does not move when the button at the right end is currently pointed to by the anchor.

8 Claims, 9 Drawing Sheets

| | FOREIGN PATENT DOCUMENTS | | |
|---|---|---|---|
| JP | 0378816 | 4/1991 | |
| JP | 6131119 | 5/1994 | |
| JP | 9-233161 | 9/1997 | |
| JP | 11-143673 | 5/1999 | |
| JP | 11-305911 | 11/1999 | |
| JP | 2002-108531 | 4/2002 | |
| JP | 2003-527710 | 9/2003 | |
| JP | 2004-94890 | 3/2004 | |
| WO | 98/12871 | 3/1998 | |
| WO | 01/69369 | 9/2001 | |

OTHER PUBLICATIONS

English Language abstract of JP 03-78816.
U.S. Appl. No. 11/392,773, filed Mar. 20, 2006.
U.S. Appl. No. 11/420,119, filed May 24, 2006.
U.S. Appl. No. 11/420,334, filed May 25, 2006.
English language Abstract of JP 2004-94890, Mar. 25, 2004.
English language Abstract of JP 11-305911, Nov. 5, 1999.
English language Abstract of JP 9-233161, Sep. 5, 1997.
English language Abstract of JP 2003-527710, Sep. 16, 2003.
English language Abstract of JP 2002-108531, Apr. 12, 2002.
English language Abstract of JP 11-143673, May 28, 1999.

* cited by examiner

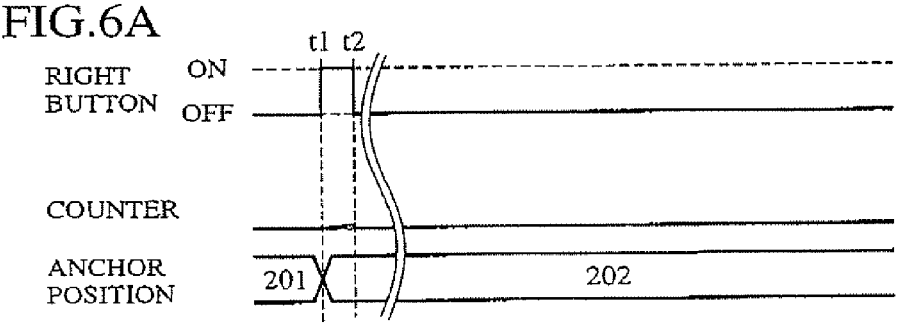
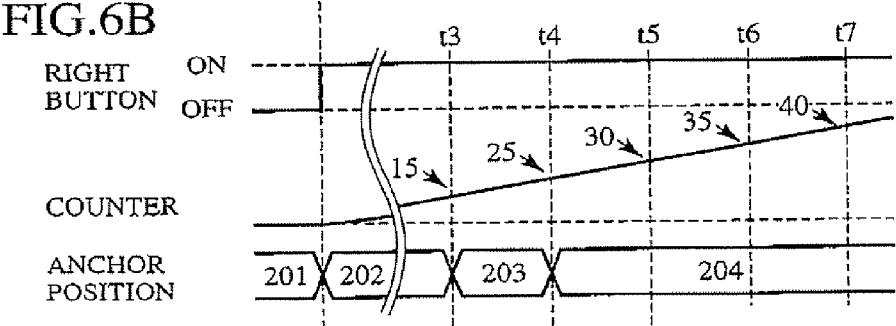
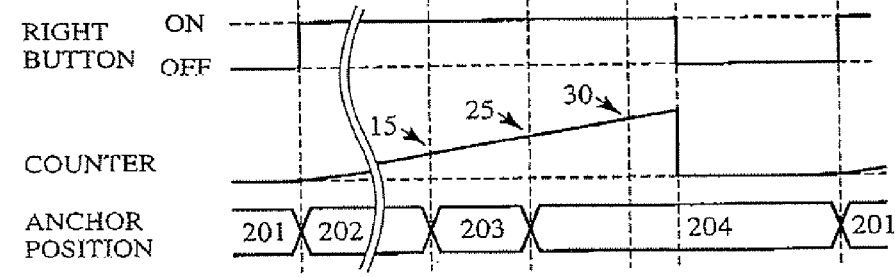

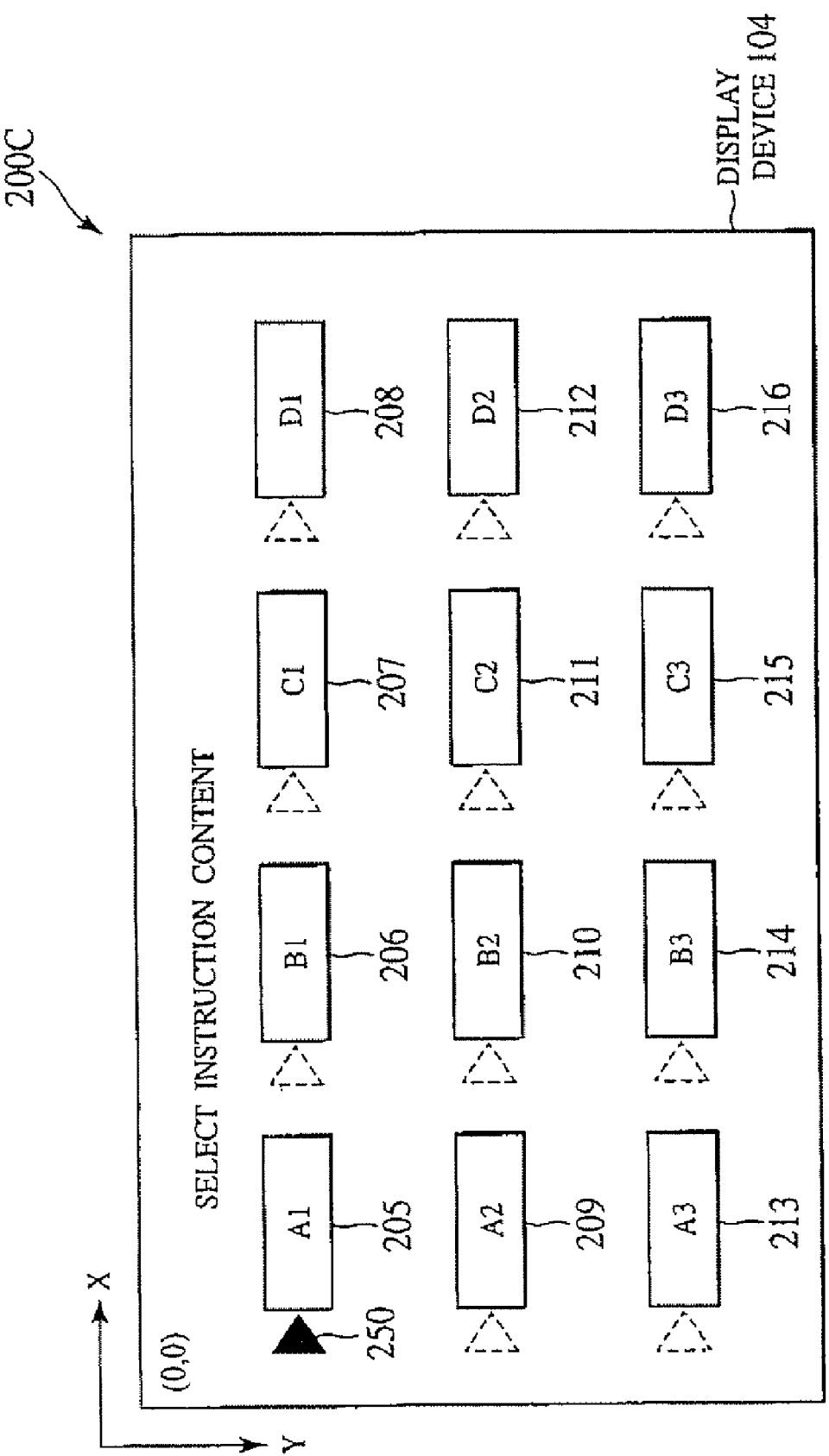

POINTER MOVEMENT DISPLAY FOR SELECTING DESIRED AVAILABLE OBJECT

CROSS REFERENCE TO RELATED APPLICATION

The present disclosure relates to subject matter contained in Japanese Patent Application No. 2005-153125, filed on May 25, 2005, the disclosure of which is expressly incorporated herein by reference in its entirety.

BACKGROUND OF THE INVENTION

1. Field of the Invention

The present invention relates to pointer movement display. More specifically, the present invention relates to moving and displaying a pointer to allow a user to select a desired available object from multiple available objects.

2. Description of the Related Art

With digital home electronics incorporating an information processing device, a user uses a menu screen to select a desired process. The menu screen is designed in such a way that as a user selects one of multiple objects associated with respective processes, the selected process is executed.

Methods that allow a user to select a desired one of multiple objects included in the menu screen include a method by which a coordinate position corresponding to a desired object is input on a display device with a mouse or through a touch panel. However, there are some devices to which an input device capable of directly inputting a coordinate position, such as a mouse or a touch panel, cannot be adapted. An input device which can input coordinates of a position irrelevant to an object, even if it is capable of inputting a coordinate position corresponding to a desired object on a display device, may not be so useful.

The methods that allow a user to select a desired one of multiple objects included in the menu screen also include a method by which pointers (anchors) are placed at multiple objects, displayed on the menu screen, and when a "Set input" is made, the objects pointed to with the pointers are selected. The pointer can be so designed as to be movable among multiple objects with the manipulation of up, down, right and left direction keys equipped on the input device. An issue is how to move the pointer in response to direction data input.

Japanese Patent Laid-Open Publication No. H6-131119 discloses that the pointer position is moved if there is another object in any of the up, down, right and left directions corresponding to direction data input through an input device (joystick 16) with respect to an object (functional button) currently pointed to with a pointer. Japanese Patent Publication No. 3249505 discloses that when the manipulation of a mouse causes a pointer to move off one end of the display area (movable area), the pointer position is moved to the other end.

However, Japanese Patent Laid-Open Publication No. H6-131119 simply considers the movement of a pointer in the input direction of a direction key. With a pointer positioned on an object displayed at the right-hand end of the display area, for example, when the right direction key is further manipulated, the pointer does not move. If the pointer is to be moved to an object to the left of the object on which the pointer is currently positioned, the key manipulation should be changed to the manipulation of the left direction key. The necessity to change the direction key to be manipulated by a user when moving the pointer reduces the operability for the user.

In the art disclosed in Japanese Patent Publication No. 3249505, when a rightward movement is input through a mouse with the pointer positioned at the right-hand end of the display area, for example, the pointer moves to the left-hand end of the display area. If the rightward manipulation causes the pointer to suddenly move to the left-hand end, the user may become uncertain of where in the display area the pointer is positioned in a sequence of continuous movements.

SUMMARY OF THE INVENTION

Accordingly, it is an object of the invention to improve the operability at the time of moving a pointer to select a desired available object from multiple available objects which are displayed on a display device.

A pointer movement display method according to a first aspect of the invention displays available objects associated with processes to be selectively executed by a user. The objects include control information comprising link information indicating another available object to which a pointer position is to be moved on a display device. The pointer movement display method enables selection of an available object corresponding to a process desired by the user by sequentially moving the pointer position on the display device in accordance with manipulation by the user.

The pointer movement display method arranges at least two of the available objects in an order according to the link information included in each available object, and displays the available objects in a display area of the display device. The pointer movement display method further determines whether a movement instruction for moving the pointer position within the display area is initially input. The pointer movement display method further moves and displays the pointer to a position corresponding to another available object indicated by the link information included in an available object corresponding to a current pointer position, in accordance with the initial movement instruction, when the movement instruction is initially input. The pointer movement display method further determines whether the movement instruction is continuously input after it is determined that the movement instruction is initially input.

The pointer movement display method further determines whether the available object corresponding to the current pointer position is displayed at an end of the display area when the movement instruction is continuously input. The pointer movement display method further moves and displays the pointer to the position corresponding to the other available object indicated by link information included in the available object corresponding to the current pointer position, in accordance with the continuous movement instruction, when the available object corresponding to the current pointer position is not displayed at the end of the display area. The pointer movement display method further displays the pointer unmoved from the current position when the available object corresponding to the current pointer position is displayed at the end of the display device and the movement instruction is continuously input.

The pointer movement display method further determines whether a set instruction for executing the process associated with the available object corresponding to the current pointer position is input. The pointer movement display method executes a process associated with the available object corresponding to the pointer position when it is determined that the set instruction is input.

According to the method, when the movement instruction is initially input, the pointer moves to a position corresponding to another available object in accordance with the link information included in an available object corresponding to the current pointer position. According to the method, when the movement instruction is continuously input, it is determined whether the available object corresponding to the current pointer position is displayed at an end of the display area. When it is determined that an available object corresponding to the current pointer position is not displayed at an end of the display area, the pointer position moves, whereas when it is determined that the available object is displayed at the end, the pointer position is stopped without moving.

According to the method, even when a user continuously inputs the movement instruction, the pointer position stops at a position corresponding to the available object displayed at the end. Accordingly, the user can easily grasp the position of the pointer at least when the pointer is moved to the available object displayed at the end, thus improving the operability at the time of moving the position of the pointer among the available objects.

When the movement instruction is initially input, the position of the pointer moves according to the link information included in an available object corresponding to the pointer position, regardless of whether the position corresponds to the available object displayed at the end. Even if the position of the pointer is stopped while the movement instruction is continuously input, the position of the pointer can be moved merely by again inputting the initial movement instruction. Therefore, the operation method does not become complicated even when the pointer is moved from the position corresponding to the available object displayed at the end.

An information processing device according to a second aspect of the invention displays on a display device available objects, associated with processes selectively executed by a user. The objects include control information comprising link information which indicates another available object to which a pointer position is to be moved. The information processing device enables selection of an available object corresponding to a process desired by the user by sequentially moving the pointer position on the display device in accordance with manipulation by the user.

The information processing device includes an available object displaying unit which arranges at least two of the available objects in an order according to the link information included in each available object, and displays the available objects in a display area of the display device. The information processing device further includes a movement input receiver that receives a movement instruction for moving the pointer position in the display area. The information processing device further includes a pointer moving unit which moves the pointer position in accordance with link information included in an available object corresponding to the current pointer position and displays the pointer when the movement instruction is input. The information processing device further includes a set input receiver that receives a set instruction for executing a process associated with the available object corresponding to the current pointer position. The information processing device further includes a set process executing unit which executes a process associated with the available object corresponding to the pointer position when the set instruction is input.

The pointer moving unit has a movement instruction determining section which determines whether the input movement instruction is an initial movement instruction or a continuous input instruction continued from the initial movement instruction. The pointer moving unit further includes an initial time pointer moving section which moves and displays the pointer to a position corresponding to another available object indicated by link information included in the available object corresponding to the current pointer position in accordance with the initial movement instruction, when the movement instruction is the initial instruction. The pointer moving unit further includes an end determining section which determines whether the available object corresponding to the current pointer position is displayed at an end of the display area when the movement instruction is the continuous movement instruction. The pointer moving unit further includes a continuous time pointer moving section which moves and displays the pointer to a position corresponding to another available object indicated by link information included in the available object corresponding to the current pointer position in accordance with the continuous movement instruction, when the available object corresponding to the current pointer position is not displayed at the end of the display area. The pointer moving unit also has a continuous time pointer stopping section which displays the pointer unmoved from the current position when it is determined that the available object corresponding to the current pointer position is displayed at the end of the display area.

An information processing device according to a third aspect of the invention displays available objects associated with processes to be selectively executed by a user. The objects include control information comprising link information indicating another available object to which a pointer position is to be moved on a display device. The information processing device enables selection of an available object corresponding to a process desired by the user by sequentially moving the pointer position on the display device in accordance with manipulation by the user.

The pointer moving unit includes a program memory which stores a program, and a processor which runs the program. The information processing device further includes an input device which inputs a movement instruction for moving the pointer position among available objects and a set instruction for selecting an available object at the pointer position in accordance with manipulation by the user.

The program includes an arranging code section which arranges at least two of the available objects in an order according to the link information included in each available object, and displays the available objects in a display area of the display device. The program further includes an initial input code section which determines whether a movement instruction is initially input from the input device. The program further includes a pointer movement code section which moves and displays the pointer to a position corresponding to another available object indicated by the link information included in an available object corresponding to a current pointer position, in accordance with the initial movement instruction, when the movement instruction is initially input. The program further includes a continuous input code section which determines whether a movement instruction is continuously input after the movement instruction is initially input.

The program further includes an end position code section which determines whether the available object corresponding to the current pointer position is displayed at an end of the display area when it is determined that the movement instruction is continuously input. The program further includes a non-end moving code section which moves and displays the pointer to a position corresponding to another available object indicated by link information included in the available object corresponding to the current pointer position, in accordance with the continuous movement instruction, when the available object corresponding to the current pointer position is not displayed at the end of the display area. The program further includes a non-moving code section which displays the pointer unmoved from the current position when the available object corresponding to the current pointer position is displayed at the end of the display device and the movement instruction is continuously input.

The program further includes a setting code section which determines whether a set instruction is input from the instruction input device. The program further includes a next process code section which jumps to a process associated with the available object corresponding to the pointer position when the set instruction is input.

The program which is stored in the program memory in the information processing device according to the third aspect of the present invention may be recorded on a computer readable recording medium and distributed in this form. The computer readable recording medium may be so constructed as to be attachable to and detachable from the information processing device, and be sold separately from the information processing device. The computer readable recording medium may be a recording medium, such as a fixed disk drive, which is provided inside the information processing device and comes equipped with the information processing device. The program which is stored in the program memory in the information processing device according to the third aspect of the invention may have its data signals superimposed on a carrier wave and be distributed over a network in this form from a server unit present in the network.

FIG; 4 is a flowchart illustrating an exemplary process which is executed frame by frame by the information processing device according to all embodiment of the invention.

Figure 4:
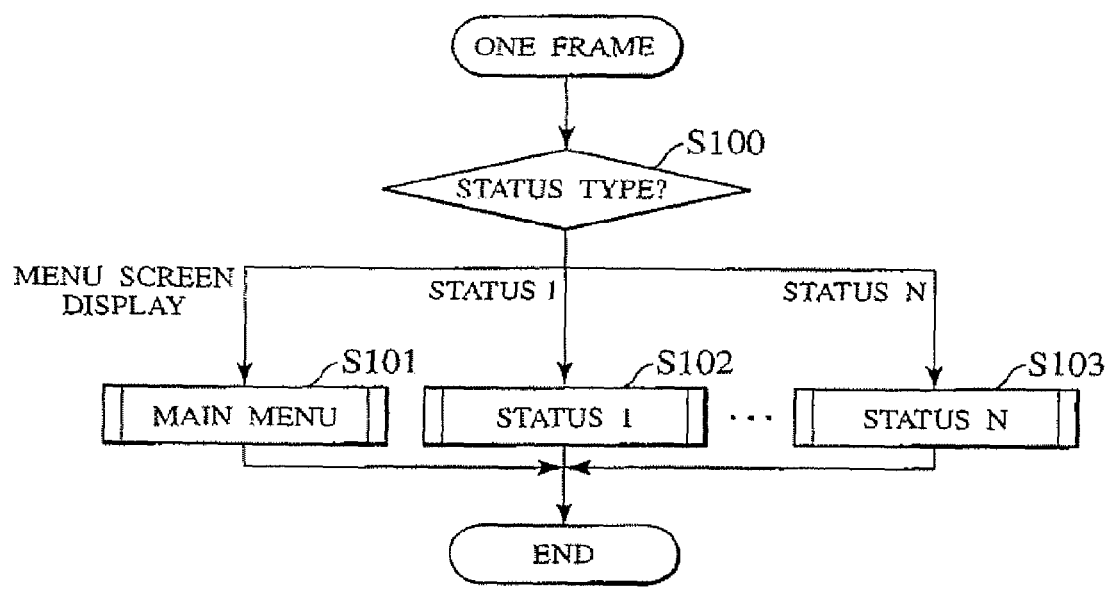
Figure 5:
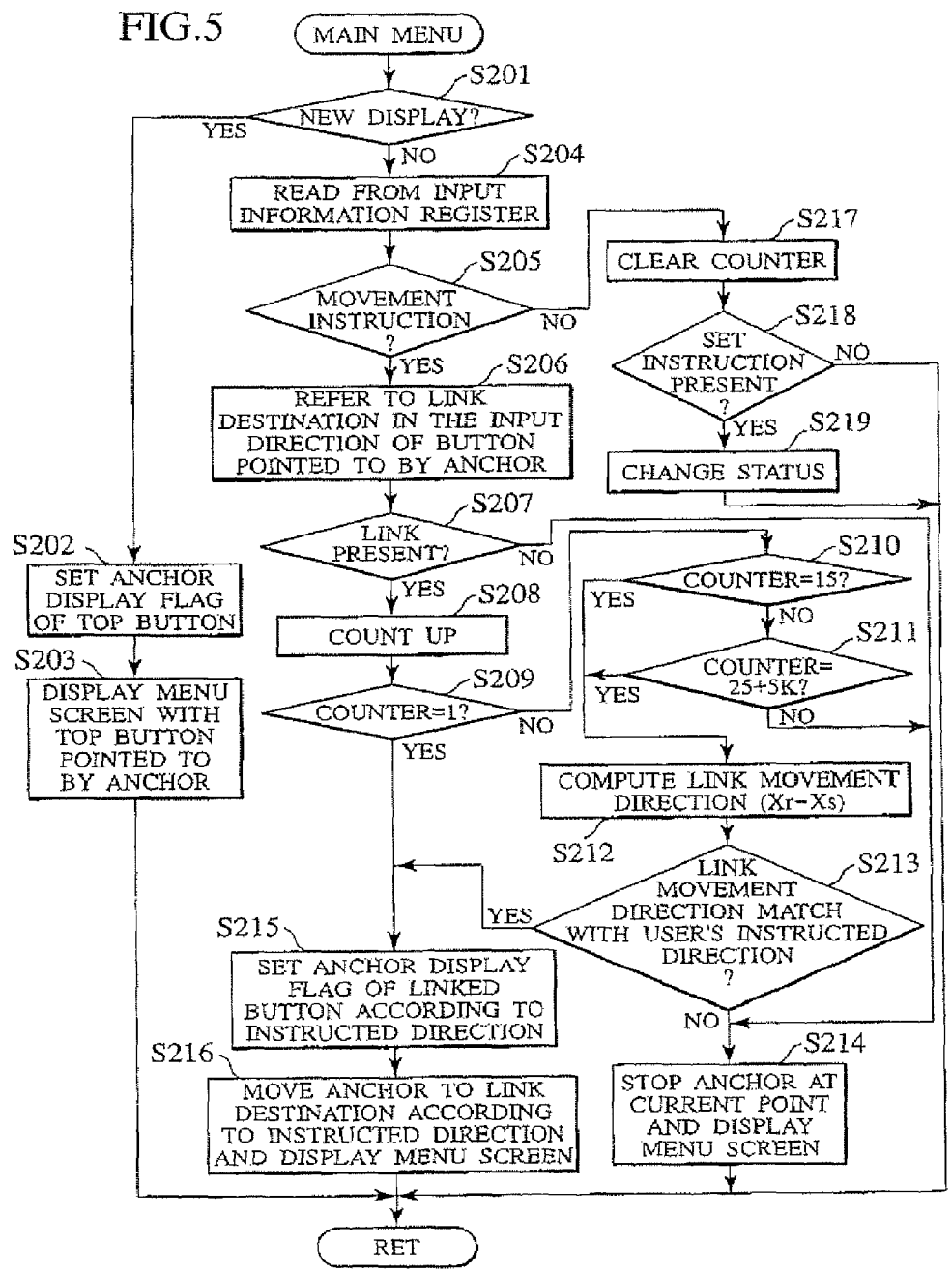

FIG. 5 is a flowchart illustrating the main menu process of FIG. 4 according to an embodiment of the present invention.

FIGS. 6A to 6C are timing charts illustrating an example of the movement of an anchor among buttons to be displayed on the menu screen of the display device according to a move instruction from a direction key of an input device.

Figure 1:
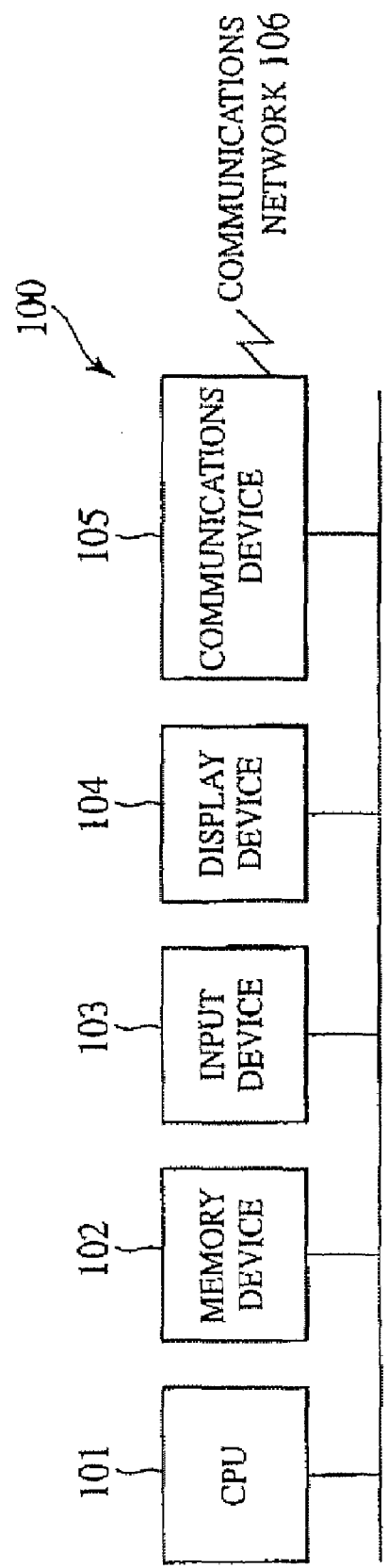
FIG. 1 is a block diagram illustrating an exemplary structure of an information processing device to be adapted to one embodiment of the present invention.
Figure 7:
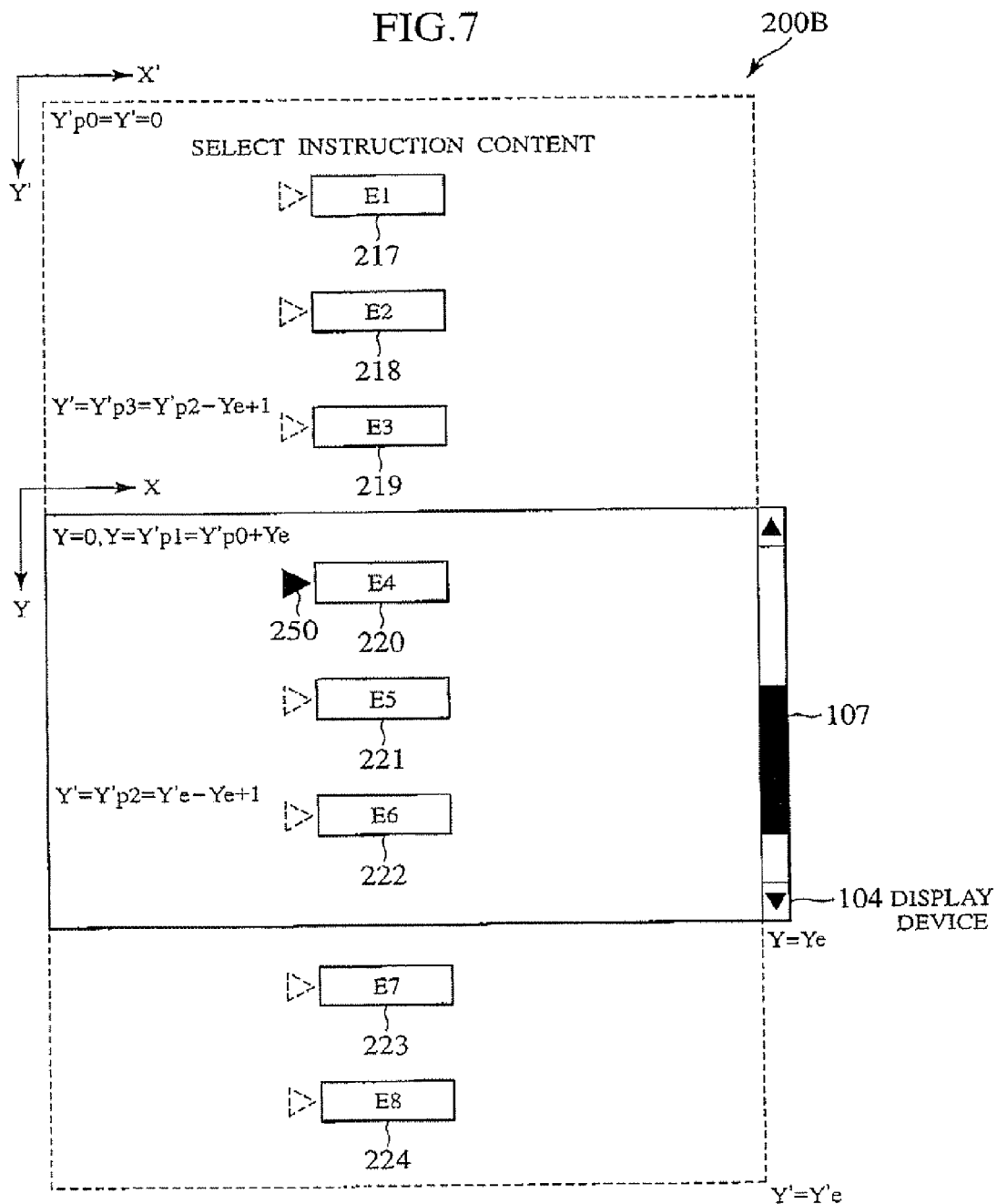

FIG. 7 is a diagram showing a menu screen which is displayed on the display device when the CPU in FIG. 1 runs a program according to a second embodiment of the invention.

Figure 8:
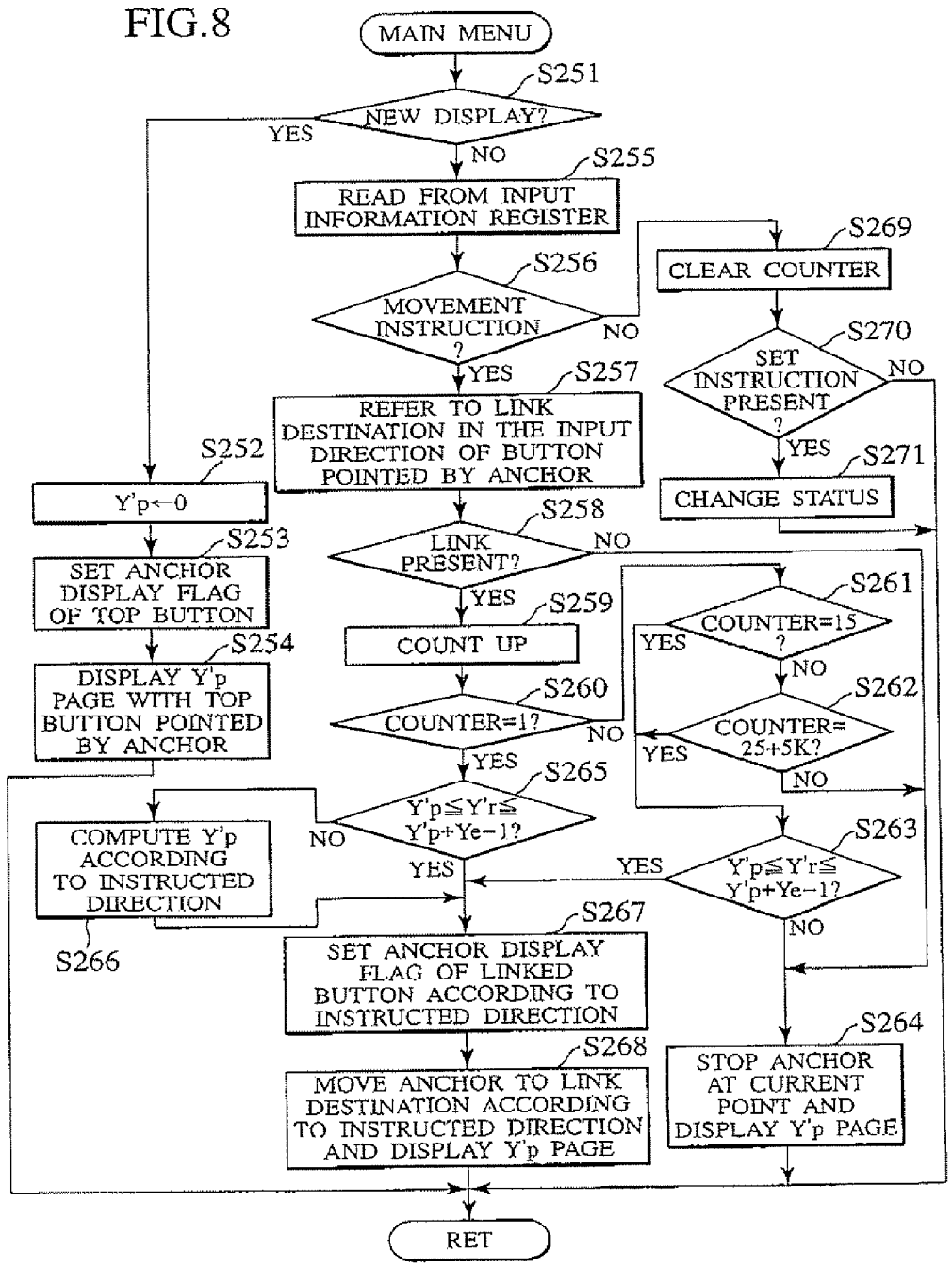

FIG. 8 is a flowchart illustrating the main menu process of FIG. 4 according to a second embodiment.

FIG. 9 is a diagram showing a modification of the menu screen which is displayed on the display device when the CPU in FIG. 1 runs a program according to the first embodiment.

DETAILED DESCRIPTION OF THE PREFERRED EMBODIMENTS

Preferred embodiments of the present invention will be described below with reference to the accompanying drawings.

A first embodiment will now be described.

FIG. 1 is a block diagram illustrating an exemplary structure of an information processing device to be adapted to one embodiment of the present invention. As illustrated in FIG. 1, an information processing device 100 includes a CPU (Central Processing Unit) 101, a memory device 102, an input device 103, a display device 104 and a communications device 105. The communications device 105 connects to a communications network 106.

The CPU 101 runs a program stored in the memory device 102 to control the information processing device 100. The CPU 101 has an internal timer, a pulse generator and a counter. Upon reception of a predetermined instruction from the input device 103 to be described later, the CPU 101 generates a predetermined number of pulses from the pulse generator, and causes the counter to start counting. The counter is used commonly for four (up, down right and left) direction keys of the input device 103 to be described later.

The memory device 102 is a memory area for storing a program and data. The memory device 102 has an input information register. The memory device 102 stores statuses to be discussed later. Upon reception of an instruction from a user, the input device 103 stores the input data into the input information register in the memory device 102. The CPU 101 interprets the input data stored in the input information register in the memory device 102, and performs a predetermined process. The input data includes key information indicating from which key of the input device 103 the input data has come, and instructionless information indicating that no instruction has been given from any key.

The input device 103 has direction keys and a Set key. As mentioned above, there are four (up, down, right and left) direction keys. The four direction keys are so designed as not to be manipulated simultaneously. Any direction key is used to move an anchor displayed on the display device 104 in a direction instructed by the user manipulating the direction key. The Set key is used to enter an instruction to set the user's selection with a button at the position of the anchor among multiple buttons displayed on the display device 104. The CPU 101 moves the position of an anchor among multiple buttons displayed on the display device 104 according to the manipulation of the direction keys of the input device 103. The CPU 101 performs a process assigned to the button where the anchor is positioned when the Set key of the input device 103 is operated.

Instructions given from the direction keys of the input device 103 that are accepted by the CPU 101 include a single input and a sequential input. When the user keeps manipulating a direction key for less than a predetermined time (e.g., ½ second), the CPU 101 determines that the instruction is a single input, and performs a process accordingly. When the user keeps manipulating a direction key for the predetermined time or longer, the CPU 101 determines that the instruction is a sequential input, and performs a process accordingly. The instruction given from the Set key of the input device 103 that is accepted by the CPU 101 is a "Set inputs". When the user operates the Set key, regardless of the duration while the Set key its kept operated (regardless of whether the operation time is less than the predetermined time, or equal to or greater than the predetermined time), the CPU 101 determines that the instruction is a single Set input, and performs a process accordingly.

The input device 103 may be a controller which comes with the main body of the information processing device 100 or a remote controller (hereinafter remocon) or the like which is provided separately from the main body.

The display device 104 is constructed by a liquid crystal display device or the like. The display device 104 displays a menu screen (to be described later) under the control of the CPU 101. The CPU 101 has a graphics processing capability. The CPU 101 processes a program and data stored in the memory device 102, and draws an image in a frame memory and outputs a signal to display the image on the screen of the display device 104. One frame period of an image included in the signal to be output is, for example, 1/30 second. The frame memory is prepared for each of two frames; one frame memory for drawing an image every frame period and the other for reading an image are alternately switched from one to the other.

With one frame period being 1/30 second, every timing at which the CPU 101 refers to input data from the input device 103 which is stored in the input information register is 1/30 second. The CPU 101 processes input data input from the input device 103 in the previous frame period (1/30 second), and performs a process frame by frame.

The communications device 105 receives instruction information from a remocon by infrared communication. A device, which is not equipped with a controller which can ensure a remote operation, such as a remocon, need not be equipped with the communications device 105.

Figure 2:
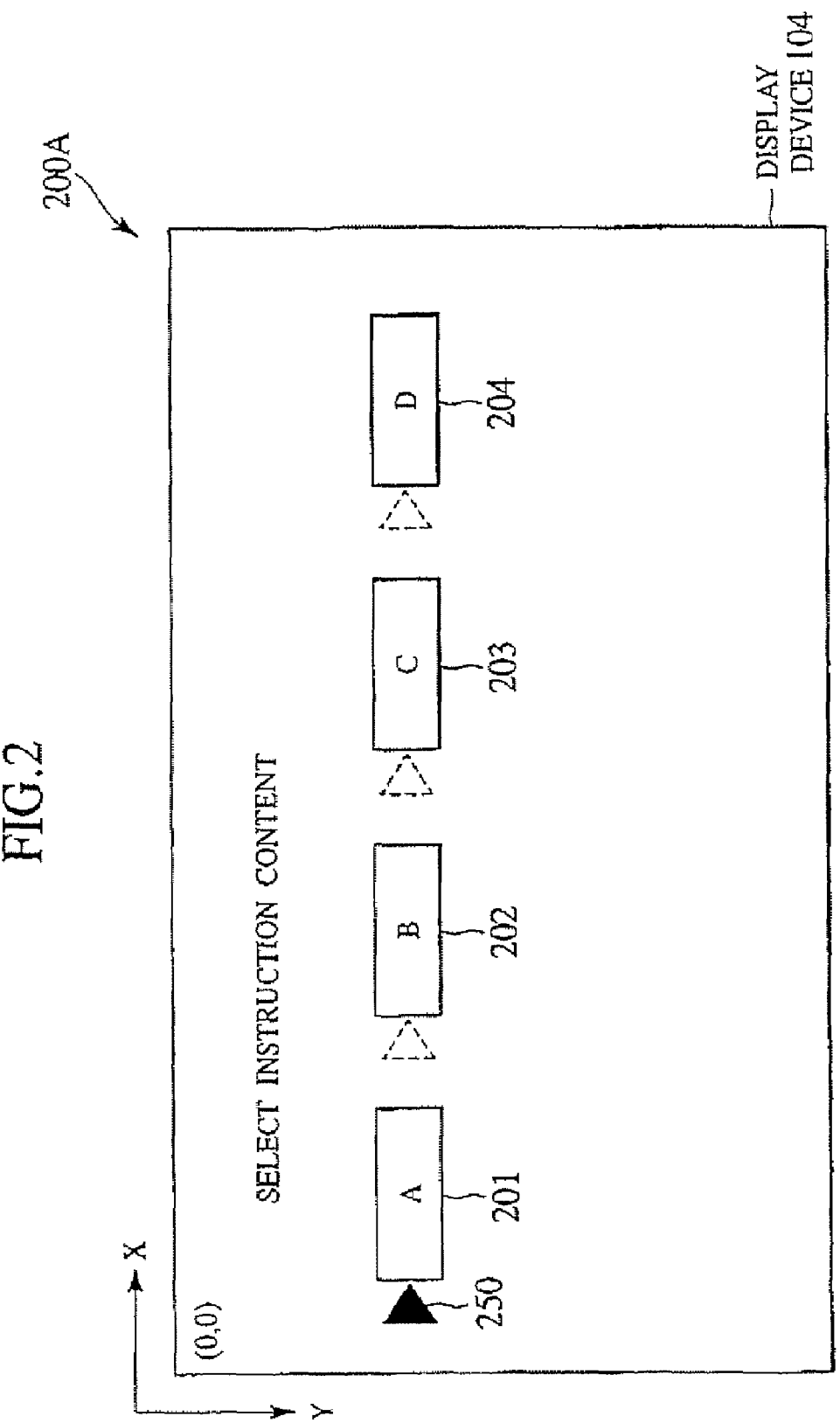
FIG. 2 is a diagram showing an exemplary menu screen which is displayed on a display device when a CPU runs a program.

FIG. 2 is a diagram showing a menu screen 200A which is displayed on the display device 104 by the CPU 101 in FIG. 1 when running a program. Regardless of the display content on the screen, a position on the display device 104 is indicated by an X coordinate and a Y coordinate of the two-dimensional orthogonal coordinate system. The pixel at the upper left corner of the display device 104 has coordinates (0, 0). For other pixels on the display device 104, one pixel corresponds to one pair of coordinates. The menu screen 200A is an entrance screen for the user to select or execute a desired process.

The right and left direction on the display device 104 is the X-axial direction. The up and down direction on the display device 104 is the Y-axial direction. The up and down on the display device 104 correspond to the up and down on the input device 103, respectively. The manipulation of the right direction key received from the input device 103 is an instruction to move the position of the anchor in the plus direction along the X axis (hereinafter called "X plus direction") on the display device 104. The manipulation of the left direction key received from the input device 103 is an instruction to move the position of the anchor in the minus direction along the X axis (hereinafter called "X minus direction") on the display device 104. The manipulation of the down direction key received from the input device 103 is an instruction to move the position of the anchor in the plus direction along the Y axis (hereinafter called "Y plus direction") on the display device 104. The manipulation of the up direction key received from the input device 103 is an instruction to move the position of the anchor in the minus direction along the Y axis (hereinafter called "Y minus direction") on the display device 104.

When there is an input from any of the up, down, right and left direction keys on the input device 103, the CPU 101 determines the instructed direction (whether the direction is the X plus direction, the X minus direction, the Y plus direction or the Y minus direction.

As shown in FIG. 2, the menu screen 200A includes multiple buttons (buttons 201, 202, 203, 204) to which different processes are assigned. The positions of the buttons 201 to 204 on the menu screen 200A are regularly laid out sideways.

Of the buttons 201 to 204, any button currently selected is pointed to by a triangular anchor 250. The position of the anchor 250 placed with respect to each button is determined in such a way that the right vertex of the triangle of the anchor 250 is positioned in the center of the left side of each button.

The user can move the position of the anchor 250 among the buttons 201 to 204 by manipulating the up, down, right and left direction keys of the input device 103. The position of the anchor 250 moves according to the up, down, right and left links (to be described later: only the rightward and leftward in this example) set for the button which is currently pointed to by the anchor 250. The up, down, right and left links respectively correspond to the up, down, right and left of the direction keys of the input device 103.

Of the displayed buttons laid out sideways on the display device 104, the leftmost button is an end button in the left direction, and the rightmost button is an end button in the right direction. The end button in the right is the button from which the anchor 250 can move only according to the initial input (to be described later) of a direction key in the right, but cannot move according to the continuous input in the direction. The same is true of the end button in the left. For the menu screen 200A having the buttons 201 to 204 laid out sideways (in the X direction), the right end button is the button 204, and the left end button is the button 201.

With the menu screen 200A displayed on the display device 104, when the Set key of the input device 103 is operated, the flow jumps to a process assigned to the button which is pointed to by the anchor 250.

Figure 3:
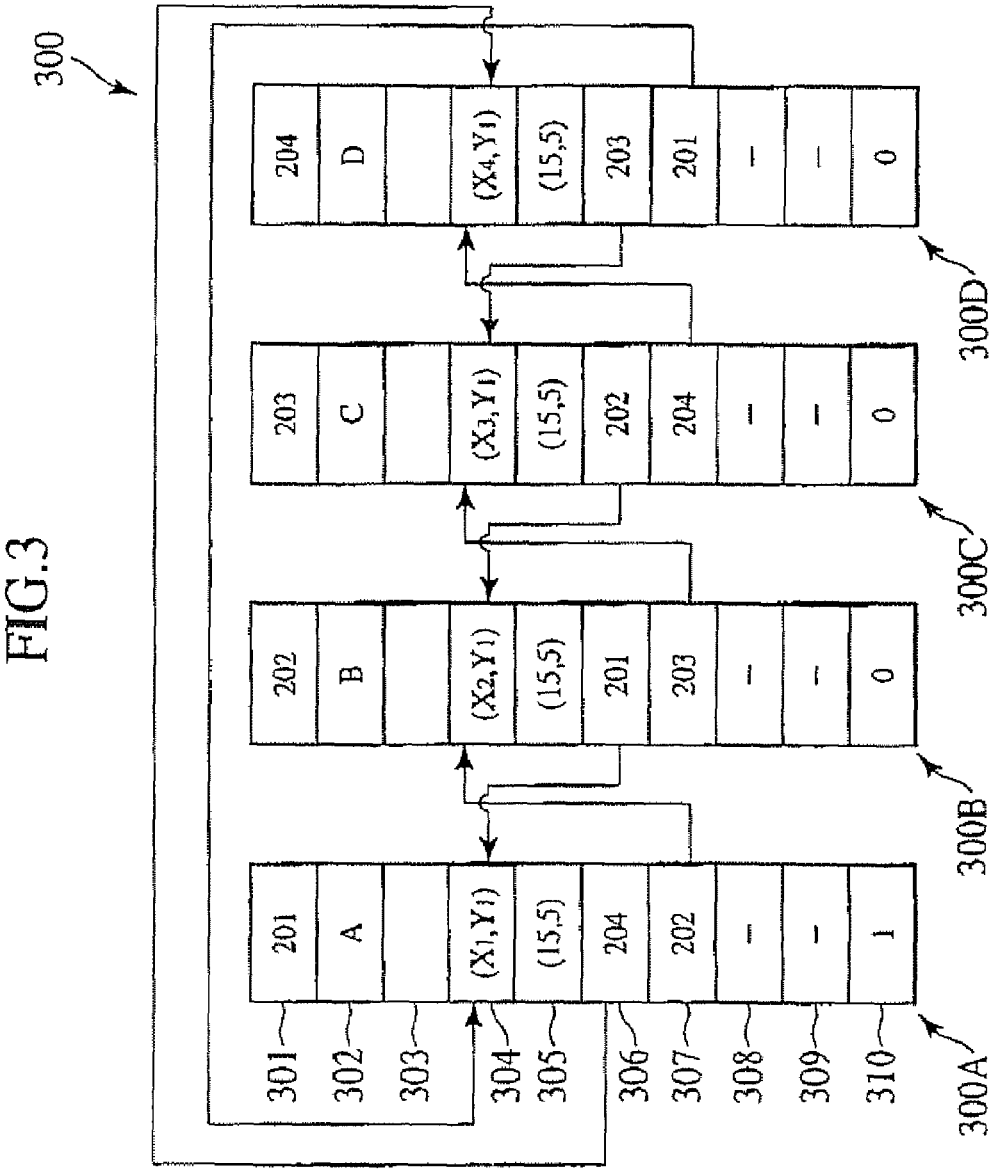
FIG. 3 is a diagram showing exemplary structures of button data for individual buttons to be displayed on the menu screen in FIG. 2.

FIG. 3 is a diagram showing exemplary structures of button data for the individual buttons which are displayed on the menu screen 200A in FIG. 2. Button data 300 are prepared as 300A to 300D for the respective buttons 201 to 204 to be displayed on the menu screen 200A. The button data 300 is included in the program. As illustrated in FIG. 3, the button data 300 includes a button ID 301, a button name 302, a process link 303, an upper left position 304, a button size 305, a left link 306, a right link 307, an up link 308, a down link 309, and an anchor display flag 310.

The button ID 301 is identification information to specifically identify each of the buttons 201 to 204. The button name 302 is the name of each of the buttons 201 to 204. The button name 302 is displayed on an area inside a button on the display device 104. The process link 303 indicates a process to which the flow shifts from the menu screen 200A when the input of the Set key of the input device 103 is made with the anchor 250 pointing to the button of interest.

The upper left position 304 is the X coordinate and the Y coordinate of the upper left position when the button is displayed on the display device 104. On the menu screen 200A, the buttons 201, 202, 203, 204 are displayed at the positions of (X1, Y1), (X2, Y1), (X3, Y1), and (X4, Y1), respectively. As the buttons 201 to 204 on the menu screen 200A have the same Y coordinate (Y1), the buttons 201 to 204 are displayed side by side in parallel in the X-axial direction.

The button size 305 indicates the length of the button in the X direction and the length thereof in the Y direction. Provided that all the buttons (buttons 201 to 204) are defined to have the same size, if a button size common to all the buttons 201 to 204 is registered as data to be included in the program, the button size 305 need not be included in the button data 300 for the individual buttons.

Each button occupies a rectangular area defined by the button size 305 on the display device 104 with the upper left position 304 as the upper left vertex. The position of the anchor 250 pointing to each button is determined by the upper left position 304 and the button size 305 in the Y direction.

The left link 306 indicates the button ID of another button to which the position of the anchor 250 will be shifted when an input from the left direction key of the input device 103 is made while the button is pointed to by the anchor 250. The right link 307 indicates the button ID of another button to which the position of the anchor 250 will be shifted when an input from the right direction key of the input device 103 is made while the button is pointed to by the anchor 250. The up link 308 indicates the button ID) of another button to which the position of the anchor 250 will be shifted when an input from the up direction key of the input device 103 is made while the button is pointed to by the anchor 250. The down link 309 indicates the button ID of another button to which the position of the anchor 250 will be shifted when an input from the down direction key of the input device 103 is made while the button is pointed to by the anchor 250.

The anchor display flag 310 is set when the button is pointed to by the anchor 250. The anchor display flag 310 having a value of "0" indicates that the button is not pointed to by the anchor 250. The anchor display flag 310 having a value of "1" indicates that the button is pointed to by the anchor 250. Only a single anchor 250 is displayed on one screen, so there is only one button whose anchor display flag 310 has a value of "1" among all the buttons 201 to 204.

In the following description, the upper left position 304 of the button which is currently pointed to by the anchor 250 is current coordinates A (Xs, Ys). When there is an input from any one of the up, down, right and left direction keys of the input device 103, the upper left position 304 in the button data 300 which is the moving destination of the anchor 250 is set to linked coordinates R (Xr, Yr). As all the buttons (buttons 201 to 204) are horizontally laid out side by side in a row, Ys and Yr are the same.

In the button data 300 for each button, the left link 306, the right link 307, the up link 308 and the down link 309 have already been set by the program that is run by the CPU 101. As all the buttons are horizontally laid out side by side in a row on the menu screen 200A, the up link 308 and the down link 309 are not set in the button data 300 for each button. When there is an input from the up or down direction key of the input device 103, the position of the anchor 250 does not move.

How the position of the anchor 250 moves among buttons displayed on the menu screen 200A will be described in detail. Links are set in the button data 300 in such a way that the position of the anchor 250 sequentially moves through all the buttons in the instructed direction (only sideways in this example) with the manipulation of any one of the up, down, right and left direction keys (only right and left direction keys in this example) of the input device 103. To make the description simpler, the description will be given of the set statuses of links among the buttons on the menu screen 200A where only four buttons (buttons 201, 202, 203, 204) are horizontally laid out side by side in a row as shown in FIG. 2.

The upper left positions 304 of the buttons 201, 202, 203, 204 displayed on the menu screen 200A are respectively (X1, Y1), (X2, Y1), (X3, Y1), and (X4, Y1). The X coordinates of all the buttons 201 to 204 are X1<X2<X3<X4.

The input from the left direction key of the input device 103 instructs movement of the position of the anchor 250 in the X minus direction. The left link 306 in the button data 300 for each button displayed on the menu screen 200A is set in such a way that the position of the anchor 250 moves in the order of the button 204, the button 203, the button 202 the button 201 according to the input from the left direction key of the input device 103.

There is no button located further left to the button 201 displayed on the menu screen 200A. The button 201 is therefore the left end button. The button ID of the button 204, which is the right end button, is set in the left link 306 of the button 201. The left link 306 for each button is set in such a way that the position of the anchor 250 moves through all the buttons leftwardly according to the input from the left direction key of the input device 103.

Like the left link 306, the right link 307 for each button is set in such a way that the position of the anchor 250 moves through all the buttons rightwardly according to the input from the right direction key of the input device 103. The up link 308 and the down link 309 are not set in the button data 300 for each button displayed on the menu screen 200A. Even if there is an input from the up or down direction key of the input device 103, the position of the anchor 250 does not move. When there is an input from the right direction key of the input device 103, the button 204 is determined as the right end button.

A detailed description will be given of the movement of the position of the anchor 250 when a direction key on the input device 103 is manipulated.

A single input is comprised of an initial input alone, while a sequential input is comprised of an initial input and a continuous input. With the initial input, when input data received from the input device 103 is information indicating the manipulation of any one of the up, down, right and left direction keys (only the right and left direction keys in this example), the position of the anchor 250 moves to the linked button from the button which is currently pointed to by the anchor 250 according to the link in the instructed direction (left link 306, right link 307). At this time, the value of the movement counter becomes "1", and the counter starts counting.

With the sequential input, when the input of the direction key continues even at the timing when the value of the counter that has been counted since the initial input becomes a predetermined value (e.g., 15, . . . , 25+5K (K being an integer equal to or greater than 0)), it is determined whether the button currently pointed to by the anchor 250 is the end button in the direction. When the button currently pointed to by the anchor 250 is not the end button in the direction, the position of the anchor 250 moves to the linked button according to the link destination in the instructed direction. When the button currently pointed to by the anchor 250 is the end button in the direction, the position of the anchor 250 does not move from the position of the end button. With the continuous input, the counter keeps counting. If there is no continuous input, the value of the counter is cleared.

When there is an initial input from the input device 103, the position of the anchor 250 moves from the current button to another button. The button to which the anchor 250 is to move to is what is indicated by the button ID sot in the link destination (link 306, 307, 308, 309) corresponding to the input direction in the button data 300 of the button (currently pointed to by the anchor 250) whose anchor display flag 310 is "1". When there is an initial input from the right direction key of the input device 103 with the anchor display flag 310 being "1" (button 201 pointed to by the anchor 250) in the button data 300A of the button 201, for example, the right link 307 in the button data 300 of the button 201 is referred to. At this time, the anchor display flag 310 is deleted from the button data 300A for the button 201, and is set in the button data 300B for the button 202.

When there is an initial input, the position of the anchor 250 moves to the button indicated by the button ID at the link destination regardless of which button is currently pointed to by the anchor 250.

Even when there is a continuous input, the position of the anchor 250 moves to the button according to the button ID indicated by the link destination corresponding to the input direction key. It is to be noted that when the button currently pointed to by the anchor 250 is the end button in the instructed direction, the position of the anchor 250 does not move from the position of the end button.

When there is an initial input from the right direction key of the input device 103 with the anchor display flag 310 being "1" in the button data 300A of the button 201, for example, the right link 307 is referred to. As the button ID indicated by the right link 307 in the button data 300A of the button 201 indicates the button 202, the position of the anchor 250 moves to the button 202. Thereafter, when the input from the right direction key continues at a predetermined timing after the initial input, the input is determined as a continuous input, the right link 307 in the button data 300B of the button 202 is referred to, and the position of the anchor 250 moves to the button 203 according to the button ID indicated by the right link 307.

When the input from the right direction key continues at a predetermined timing after the initial input, the position of the anchor 250 is moved rightward, but even if the continuous input continues when the position of the anchor 250 comes to the position of the button 204, which is the right end button, the position of the anchor 250 is not moved from the position of the button 204.

When the position of the anchor 250 comes to the position of the end button in the instructed direction regardless of which button whose initial input has been made, the movement of the position of the anchor 250 stops at the position of the end button even when there is continuous input. In order to move the position of the anchor 250 when the anchor 250 points to the end button in the instructed direction, an initial input should be made again. In the sequential input comprised of an initial input and a continuous input, the movement of the position of the anchor 250 stops at the position of the end button in the instructed direction, irrespective of which direction key has given a sequential input.

When a continuous input is made, whether the button pointed to by the anchor 250 is the end button in the instructed direction is determined by whether the sign (plus or minus) of the result of comparison between the current coordinates A (Xs, Ys) and the linked coordinates R (Xr, Yr) (plus or minus of (Xr−Xs) in this example) matches with the plus or minus in the direction instructed by the user (minus for an input from the left direction key or plus for an input from the right direction key).

The following will describe an exemplary process that is executed by the information processing device 100 according to an embodiment. FIG. 4 is a flowchart illustrating a frame process which is executed frame by frame by the CPU 101. The frame process is executed every 1/30 second upon timer interruption made by the internal timer in the CPU 101. The frame process is always terminated within 1/30 second.

The CPU 101 determines which type of status is to be executed (step S100). The memory device 102 stores a process status that defines the process to be executed in each frame period. When the process status stored in the memory device 102 is "display of menu screen", the CPU 101 performs a main menu process (step S101). Then, the frame process is terminated. The details of the main menu process will be given later.

When the determined status type is other than "display of menu screen", the CPU 101 executes a process which matches with the type of each determined status (status 1, ..., status n) (step S102, S103). Then, the frame process is terminated. As steps S102 and S103 are not directly related to the present invention, their descriptions will be omitted. The CPU 101 repeats the frame process in the aforementioned manner and draws an image on the display device 104.

Exemplary details of the main menu process in step S101 will be given below. FIG. 5 is a detailed flowchart illustrating the main menu process which is executed by the CPU 101 in step S101. At the time the menu screen 200A is displayed on the display device 104, the CPU 101 determines whether a new menu screen 200A is to be displayed or not (step S201). At this time, the CPU 101 makes this decision by checking if the anchor display flags 310 for all the buttons to be displayed on the menu screen 200A are not set.

To display the menu screen 200A on the display device 104, the CPU 101 sets the anchor display flag 310 of the button (button 201 in the example in FIG. 2) at the top position (upper left position) in all the buttons (buttons 201 to 204 in the example in FIG. 2) to be displayed on the menu screen 200A (step S202). The CPU 101 puts the anchor 250 at the top button whose anchor display flag 310 is sets and displays the menu screen 200A on the display device 104 (step S203). Then, the main menu process is terminated, and the flow returns to the frame process in FIG. 4.

When a new menu screen 200A is not to be displayed on the display device 104, the CPU 101 reads input data from the input information register in the memory device 102 (step S204). The CPU 101 determines whether or not there is an input from any one of the up, down, right and left direction keys of the input device 103 (step S205).

When there is an input from any one of the up, down, right and left direction keys, the CPU 101 refers to the link 306, 307, 308, 309 according to the input direction for the button whose anchor display flag 310 is set (the button pointed to by the anchor 250). When the button 201 is currently pointed to by the anchor 250 and there is an input from the right direction key of the input device 103, the CPU 101 refers to the right link 307 in the button data 300A for the button 201 (step S206).

The CPU 101 determines whether or not the button ID) of another button is set in the referred link or not (step S207). When the button ID of another button is not set in the referred link, the flow proceeds to step S214. At this time, the CPU 101 keeps displaying the menu screen 200A without moving the position of the anchor 250. Because the up link 308 and the down link 309 of every button are not set in the example in FIG. 2, the CPU 101 keeps displaying the menu screen 200A without moving the position of the anchor 250 when there is an input from the up or down direction key of the input device 103.

When the button ID of another button is set in the referred link (only the right and left links in the example in FIG. 2), the CPU 101 generates a pulse and increments the value of the counter by "1" (step 8208). The CPU 101 determines whether or not the value of the counter is "1" (step S209). The value of the counter becomes "1" when the input in the direction key (only the right and left direction keys in the example in FIG. 2), is an initial input.

When the value of the counter is "1", the flow proceeds to step S215. When the value of the counter is not "1", which is a case where the input from the direction key (only the right and left direction keys in the example in FIG. 2) is a continuous input, the CPU 101 determines whether or not the value of the counter is "15" (step S210). When the value of the counter is not "15", the CPU 101 determines whether or not the value of the counter is "25+5K" (step S211). When the value, of the counter is not "25+5K", the flow proceeds to step S214. At this time, the CPU 101 determines how long the continuous input from the direction key has been made since the initial input, based on the value of the counter.

When the value of the counter is "15" or "25+5K", the CPU 101 determines from which direction key (only the right and left direction keys in the example in FIG. 2) the input has been made, and determines whether the movement direction (link movement direction) of the coordinates of the linked button from the coordinates of the button currently pointed to by the anchor 250 is plus or minus by subtracting the current coordinates A (Xs, Ys) from the linked coordinates R (Xr, Yr) according to the coordinates in the direction instructed by the user (the X axis if the direction is right and left direction or the Y axis if the direction is up and down direction) (S212).

In the example in FIG. 2, when the direction instructed by the user is rightward, the current coordinate Xs is subtracted from the linked coordinate Xr along the X axis. When the direction instructed by the user is rightward with the button 201 currently pointed to by the anchor 250, X1 is subtracted from X2. As X1<X2, the link movement direction (X2−X1) becomes plus. When the direction instructed by the user is rightward with the button 204 currently pointed to by the anchor 250, the link movement direction (X1−X4) becomes minus.

The CPU 101 determines whether the plus or minus sign of the movement direction (Xr−Xs) of the linked coordinate computed in step S212 matches with the plus or minus sign of the direction instructed by the user (minus if the direction is upward or leftward or plus if the direction is downward or rightward) (step S213).

When it is determined in step S213 that the plus or minus sign of the movement direction does not match with the plus or minus sign of the direction instructed by the user, the flow proceeds to step S214. In step S214, the CPU 101 keeps placing the anchor 250 at the button currently pointed to by the anchor 250, and displays the menu screen 200A on the display device 104. Thereafter, the main menu process is terminated, and the flow returns to the frame process in FIG. 4.

At this time, even when having received an instruction to move the position of the anchor 250 through the continuous input from any one of the up, down, right and left direction keys of the input device 103, the CPU 101 does not move the position of the anchor 250 according to the instruction. The movement of the position of the anchor 250 stops at the position of the button currently pointed to by the anchor 250. When the button currently pointed to by the anchor 250 is the right end button 204 and there is a continuous input from the right direction key, for example, the link movement direction becomes minus in the X direction while the direction instructed by the user is plus in the X direction, so that there is no match. At this time, even if the manipulation of the direction key by the user continues, the position of the anchor 250 does not move from the button 204.

When it is determined in step S213 that the plus or minus sign of the movement direction matches with the plus or minus sign of the direction instructed by the user, the flow proceeds to step S215. It is determined that there is a match when the button currently pointed to by the anchor 250 is not at the end in the direction instructed by the user. If the button 201, the button 202 or the button 203 is the button currently pointed to by the anchor 250, and there is a continuous input from the right direction key, the direction instructed by the user is plus in the X direction and the link movement direction is also plus in the X direction, so there is a match.

In step S215, the CPU 101 refers to the button data 300 for the button currently pointed to by the anchor 250, and moves the position of the anchor 250 to the linked button in the user's instructed direction input from any one of the up, down, right and left direction keys (only the right and left direction keys in the example in FIG. 2). The CPU 101 resets the anchor display flag 310 before movement, and sets the anchor display flag 310 of the button where the anchor 250 is to move. The CPU 101 moves the position of the anchor 250 to the button whose anchor display flag 310 is newly set, and displays the buttons 201 to 204 on the display device 104 (step S216). Thereafter, the main menu process is terminated, and the flow returns to the frame process in FIG. 4.

When no input from any direction key is made in step S205, the CPU 101 clears the value of the counter to "0" (step S217). The CPU 101 determines whether there is an input from the Set key of the input device 103 or not (step S218).

When there is no input from the Set key, the main menu process is terminated, and the flow returns to the frame process in FIG. 4. When there is an input from the Set key, the CPU 101 shifts the control from the process in the flowchart in FIG. 4 to the status process indicated by the process link 303 for the button whose anchor display flag 310 is set. The CPU 101 then resets the anchor display flag 310 of every button (step S219). Thereafter, the main menu process is terminated, and the flow returns to the frame process in FIG. 4.

The following will describe a specific example of the movement of the position of the anchor 250 pointing to a button displayed on the menu screen 200A. FIGS. 6A to 6C are timing charts illustrating an example of the movement of the anchor 250 to be displayed on the menu screen 200A of the display device 104 according to an instruction given from a direction key of the input device 103. It is assumed that in FIGS. 6A to 6C, the right direction key alone is manipulated, and the left direction key, the up direction key and the down direction key are not manipulated. An initial input from the right direction key is input to the CPU 101 at timing t1.

In FIG. 6A, the button 201 is pointed to by the anchor 250 in the initial state. When there is an initial input frown the right direction key at timing t1, the CPU 101 sets the value of the counter to "1". The CPU 101 refers to the right link 307 in the button data 300A of the button 201. The CPU 101 then moves the position of the anchor 250 to the button 202 which is the link destination. If there is an input from the right direction key thereafter, the CPU 101 increments the value of the counter whose counting has started at timing t1 by "1" every 1/30 second at which timing the CPU 101 receives an instruction from the input device 103.

When there is no further manipulation of the right direction key at timing t2 before the value of the counter becomes "15", the CPU 101 clears the value of the counter to "0". With the button 202 pointed to by the anchor 250, the CPU 101 stands by for a new instruction input from the input device 103.

In FIG. 6B, the CPU 101 increments the value of the counter by "1" every 1/30 second which is one frame period, after moving the position of the anchor 250 to the button 202 from the button 201 as done in FIG. 6A. When an input from the right direction key continues and is determined to be a continuous input at timing t3 by which the value of the counter becomes "15", the CPU 101 refers to the right link 307 in the button data 300B of the button 202 pointed to by the anchor 250. The CPU 101 then moves the position of the anchor 250 to the button 203 which is the link destination. If an input from the right direction key continues thereafter, the CPU 101 increments the value of the counter whose counting has started at timing t1 by "1" every 1/30 second at which timing the CPU 101 receives an instruction from the input device 103.

When an input from the right direction key continues and is determined to be a continuous input at timing t4 by which the value of the counter becomes "25", the CPU 101 refers to the right link 307 in the button data 300B of the button 203 pointed to by the anchor 250. The CPU 101 then moves the position of the anchor 250 to the button 204 which is the link destination.

Thereafter, when an input from the right direction key continues, the CPU 101 refers to the right link 307 in the button data 300D of the button 204 pointed to by the anchor 250 at timings t5, t6 and t7 where the counted value of the counter becomes "25+5K". The button 204 is the right end button, so that the CPU 101 stops moving the position of the anchor 250 at the position of the button 204.

In FIG. 6C, the CPU 101 moves the position of the anchor 250 to the button 202 from the button 201, to the button 203 from the button 202, and to the button 204 from the button 203, and then increments the value of the counter by "1" every $\frac{1}{30}$ second or one frame period, as done in FIG. 6B. When no input comes from the right direction key at timing t8 before the value of the counter changes to "35" from "30", the CPU 101 clears the value of the counter whose counting has started at timing t1 to "0". When there is no further input from the right direction key, the value of the counter stays "0".

When there is an initial input from the right direction key again at timing t9, the CPU 101 newly starts the counting operation of the counter. As the value of the counter becomes "1", the CPU 101 refers to the right link 307 in the button data 300D of the button 204. The CPU 101 then moves the position of the anchor 250 to the button 201 which is the link destination.

According to the first embodiment, as described above, manipulating any one of the up, down, right and left direction keys of the input device 103, the user can move the position of the anchor 250 according to the link destination, in the instructed direction, of that one in all the buttons displayed on the display device 104 which is currently pointed to by the anchor 250.

When the user's instruction is an initial input, irrespective of whether the movement direction is the direction instructed by the user or not, the position of the anchor 250 moves according to the link destination, in the instructed direction, of the button currently pointed to by the anchor 250. In a case where the user's instruction is a continuous input, when the position of the anchor 250 comes to the position of the button at one end in the user's instructed direction, the position of the anchor 250 stops at the position of the end button. When the initial instruction in the same direction is given by the user again thereafter, the position of the anchor 250 moves to the button located at the opposite end in the instructed direction according to the link destination, in the instructed direction.

As the position of the anchor 250 stops when the position of the anchor 250 reaches the position of the button at one end in the user's instructed direction, the position of the anchor 250 does not move leftward abruptly while an input from the right direction key continues. This allows the user to adequately grasp the button at which the anchor 250 is positioned, thereby improving the operability for the user. Even when the position of the anchor 250 stops at the position of the button at one end in the user's instructed direction, an initial input can be made through the same direction key used for the previous continuous input, and the position of the anchor 250 moves in the opposite direction. This allows the user to move the position of the anchor 250 sequentially from the button at one end in the user's instructed direction to another button by manipulating one direction key, thereby improving the operability for the user.

On the menu screen 200A displaying all the buttons 201 to 204 horizontally in a row as shown in FIG. 2, an input from the right direction key can move the position of the anchor 250 in order from the button 201 to the button 202, from the button 202 to the button 203, and from the button 203 to the button 204. With the manipulation of the left direction key, the user can move the position of the anchor 250 in order from the button 204 to the button 203, from the button 203 to the button 202, and from the button 202 to the button 201. As the user can select the moving direction of the position of the anchor 250 according to the position of a desired button to which the user wants to move the position of the anchor 250, the operability is improved for the user.

Whether or not the button currently pointed to by the anchor 250 is an end button in the instructed direction, when there is a continuous input from a direction key, is determined based on the position of the button and the position of another button indicated by link information according to the direction instructed by the button. At this time, the direction of the button of interest is compared with the direction of the linked button according to the instructed direction. As the CPU 101 can determine whether the button of interest is an end button in the instructed direction by performing a comparatively simple determination, such as comparison between the positions of two buttons and comparison between the instructed direction and the relationship between the directions of both buttons, the processing load is light.

A second embodiment of the present invention will now be described.

The foregoing description of the embodiment has been given of the case where the menu screen 200A is displayed full page on the display device 104, and the position of the anchor 250, which is moved according to an input from a direction key, moves through all the buttons displayed. The case is premised on the fact that the circulating movement takes place among buttons on a screen where the link destinations of all the direction keys are displayed on the display device 104.

Depending on the contents of the screen, every button pointed to by the anchor 250 may not fit in the display area of the display device 104. The position of the anchor 250, which is moved by the manipulation of any one of the up, down, right and left direction keys, may move to a button which is not displayed on the display device 104. When there are many buttons included on the menu screen and not every button fits in the display area of the display device 104, the CPU 101 needs to scroll the screen according to the instruction to move the anchor 250. The following description of a second embodiment will be given of a case where not every button included on the menu screen fits in the display area of the display device 104, and the position of the anchor 250 moves among buttons while scrolling the menu screen.

FIG. 7 is a diagram showing a menu screen 200B which is displayed on the display device 104 when the CPU 101 runs a program according to the second embodiment. Regardless of the display contents of the screen, a position on the display device 104 is indicated by the X coordinate and Y coordinate of the two-dimensional orthogonal coordinate system. The coordinates of the upper leftmost pixel of the display device 104 are (0, 0). For other pixels on the display device 104, one pixel corresponds to one set of coordinates. The coordinates of the lower rightmost pixel (X, Y) of the display device 104 are (Xe−1, Yc−1).

The size of the menu screen 200B is longer than the display area of the display device 104. A position on the menu screen 200B is indicated by the X' coordinate and Y' coordinate of the X'-Y' coordinate system. The coordinates (X', Y') of the upper leftmost pixel on the menu screen 200B are (0, 0). For other pixels on the menu screen 200B, one pixel corresponds to one set of coordinates. The size of one pixel on the menu screen 200B is the same as the size of each pixel of the display device 104. The coordinates (X', Y') of the lower rightmost pixel of the menu screen 200B are (Xe'−1, Ye'−1).

A scroll position indicator 107 is set on the right-hand side of the display device 104. The scroll position indicator 107 indicates which part of the menu screen 200B is the content currently displayed on the display device 104.

Every time the menu screen 200B is newly displayed, or every time the screen is scrolled according to the link destination of a button at one end with the anchor 250 pointing to the button at the end, the CPU 101 determines a scroll reference point P on the menu screen 200B. The scroll reference point P (X'p, Y'p) set on the menu screen 200B is displayed at the upper left position ((X, Y)=(0, 0)) of the display device 104. In the example in FIG. 7, the X' coordinate of the scroll reference point Pr regardless of where on the menu screen 200B it is set, is 0, so that the scroll reference point P is taken as a scroll reference point Y'p.

The menu screen 200B is displayed and scrolled on the display device 104 every Y'p. When the menu screen 200B is displayed in the initial state, Y'p=0, and a range of $0 \leq Y' \leq Ye-1$ is displayed on the display device 104. When the Y' coordinate of the upper leftmost position of the display device 104 on the menu screen 200B currently displayed on the display device 104 is Y'p, let a Y'p page be the content of the displayed menu screen 200B.

For instance, the user can manipulate the down direction key to move the position of the anchor 250 from a button 217 located at the topmost position on the menu screen 200B. As the user moves the position of the anchor 250, the screen is scrolled downward and the value of Y'p changes to 0, Ye, and so forth. When the user scrolls the screen downward to show the bottommost point Y'e of the menu screen 200B, the value of Y'p becomes Y'e−Ye+1, which is the Y coordinate of a point higher than Y'e or the Y' coordinate of the bottommost point of the menu screen 200B by the size thereof in the Y direction of the display device 104.

The user can manipulate the up direction key to move the position of the anchor 250 from a button 224 located at the bottommost position on the menu screen 200B. As the user moves the position of the anchor 250, the screen is scrolled upward and the value of Y'p changes to Y'e−Ye+1, Y'e−2Ye+1, and so forth. When the user scrolls the screen upward to show the topmost point 0 of the menu screen 200B, the value of Y'p becomes 0.

As the user newly displays the menu screen 200B in FIG. 7 and scrolls the screen downward, the value of Y'p changes to Y'p0, Y'p1, then Y'p2. As the user displays the bottommost portion of the menu screen 2008 in FIG. 7 and scrolls the screen upward, the value of Y'p changes to Y'p2, Y'p3, then Y'p0. In this description, Y'p0=0, Y'p1=Y'p0+Ye=Ye, Y'p2=Y'e−Ye+1, and Y'p3=Y'p2−Ye+1=Y'e−2Ye+1.

As shown in FIG. 7, the menu screen 200B includes buttons (buttons 217 to 224) to which different processes are assigned. The positions of the individual buttons (buttons 217 to 224) are regularly and vertically laid out in a column on the menu screen 200B. As the buttons 217 to 224 are at the same X' coordinate on the menu screen 200B, the buttons are displayed in parallel in the Y' direction.

In FIG. 7, the buttons to be displayed on the y'p0 page are the buttons 217 to 219. The buttons to be displayed on the Y'p1 page are the buttons 220 to 222. The buttons to be displayed on the Y'p2 page are the buttons 222 to 224. The buttons to be displayed on the Y'p3 page are the buttons 219 to 221.

The structure of the button data 300 of each button included in the menu screen 200B is the same as that in the first embodiment, and the button data 300 is prepared for each of the buttons 217 to 224 included in the menu screen 2008. As will be discussed later, up and down links are set to the button data 300 in this embodiment.

The down link 309 in the button data 300 for each button included in the menu screen 200B shown in FIG. 7 is set in such a way that the position of the anchor 250 moves downward from the button 217 to the button 218, from the button 218 to the button 219, from the button 219 to the button 220, from the button 220 to the button 221, from the button 221 to the button 222, from the button 222 to the button 223, and from the button 223 to the button 224 in accordance with an input from the down direction key. The up link 308 in the button data 300 for each button included in the menu screen 200B is set in such a way that the position of the anchor 250 moves upward from the button 224 to the button 223, from the button 223 to the button 222, from the button 222 to the button 221, from the button 221 to the button 220, from the button 220 to the button 219, from the button 219 to the button 218, and from the button 218 to the button 217 in accordance with an input from the up direction key. The up link 308 of the button 217 and the down link 309 of the button 224 are not set. The left link 306 and the right link 307 of each of the buttons (buttons 217 to 224) are not set.

On each Y'p page to be displayed on the display device 104, every button whose upper leftmost position 304 has the Y' coordinate ranging from Y'p to Y'p+Ye−1 is displayed on the display device 104. Of all the buttons displayed on the Y'p page, the button that is positioned topmost in the display area of the display device 104 is the button at the upper end (hereinafter "upper end button") on the Y'p page. A button which is indicated by the up link 308 of the upper end button on the Y'p page is not currently displayed on the display device 104. For the downward direction, likewise, the button that is positioned bottommost in the display area of the display device 104 is the button at the lower end (hereinafter "lower end button") on the Y'p page. With the Y'p1 page displayed on the display device 104, the upper end button is the button 220, and the lower end button is the button 222.

With the anchor 250 pointing to a button at an end on the Y'p page in any direction (only the up and down direction keys in the example in FIG. 7), when there is an input in the direction associated with that end, the CPU 101 scrolls the screen by the size of the display area of the display device 104 in the Y direction thereof according to the input direction, and causes the anchor 250 to point to the button to be the link destination in the input direction of the button at the end, and displays the button pointed to by the anchor 250.

In a case where the Y'p1 page is displayed on the display device 104 as shown in FIG. 7, when there is an initial input in the upward direction with the upper end button 220 pointed to by the anchor 250, the screen is scrolled upward, and the Y'p0 page is displayed in order to display the button 219 which is indicated by the up link 308 of the button 220, and the button 219 is pointed to by the anchor 250.

An exemplary process according to the embodiment will be described below. The second embodiment differs from the first embodiment in the main menu process. Therefore, the following will discuss the main menu process.

FIG. 8 is a detailed flowchart illustrating the main menu process which is executed by the CPU 101 in step S101 in the second embodiment. The CPU 101 determines whether a menu screen 200B is to be changed from another screen and newly displayed or not (step S251). At this time, the CPU 101 makes this decision by checking if the anchor display flags 310 for all the buttons (buttons 217 to 224) to be displayed on the menu screen 200B are not set.

To display the menu screen 200B on the display device 104, the CPU 101 substitutes "0" for Y'p to set the scroll reference point P (step S252). The CPU 101 sets the anchor display flag 310 of the button (button 217 in the example in FIG. 7) at the top position (topmost position) in all the buttons (buttons 217 to 219 in the example in FIG. 7) to be displayed on the display device 104 (step S253).

The CPU 101 converts the coordinates of each pixel on the menu screen 200B in the X'-Y' coordinate system to the coordinates of the X-Y coordinate system of the display device 104 in such a way that Y'p becomes Y=0 of the display device 104. The CPU 101 causes the anchor 250 to point to the topmost button whose anchor display flag 310 is set, and displays the menu screen 200B (Y'p0 page) on the display device 104 (step S254). Thereafter, the main menu process is terminated, and the flow returns to the frame process in FIG. 4.

When a new menu screen 200B is not to be displayed on the display device 104, the CPU 101 reads input data from the input information register in the memory device 102 (step S255). The CPU 101 determines whether or not there is an input from any one of the up, down, right and left direction keys of the input device 103 (step S256).

When there is an input from any one of the up, down, right and left direction keys, the CPU 101 refers to the link 306, 307, 308, 309 according to the input direction for the button whose anchor display flag 310 is set. With the Y'p1 page displayed on the display device 104 and the button 220 currently pointed to by the anchor 250, when there is an input from the down direction key of the input device 103, the CPU 101 refers to the down link 309 in the button data 300 for the button 220 (step S257).

The CPU 101 determines whether or not the button ID of another button is set in the referred link or not (step S258). When the button ID of another button is not set in the referred link, the flow proceeds to step S264. At this time, the CPU 101 keeps displaying the menu screen 200B (Y'p page) without moving the position of the anchor 250. Because the left link 306 and the right link 307 of every button are not set in the example in FIG. 7, the CPU 101 keeps displaying the menu screen 20013 (Y'p page) without moving the position of the anchor 250 when there is an input from the right or left direction key, regardless of which button is pointed to by the anchor 250.

When the button ID of another button is set in the referred link (only the up and down links in the example in FIG. 7), the CPU 101 generates a pulse and increments the value of the counter by "1" (step S259). The CPU 101 determines whether or not the value of the counter is "1" (step S260). The value of the counter becomes "1" when the input from the direction key (only the up and down direction keys in the example in FIG. 7) is an initial input.

When the value of the counter is not "1", which is a case where the input from the direction key (only the up and down direction keys in the example in FIG. 7) is a continuous input, the CPU 101 determines whether or not the value of the counter is "15" (step S261). When the value of the counter is not "15", the CPU 101 determines whether or not the value of the counter is "25+5K" (step S262). When the value of the counter is not "25+5K", the flow proceeds to step S264. At this time, the CPU 101 determines how long the continuous input from the direction key has been made since the initial input, based on the value of the counter.

When the value of the counter is "15" or "25+5K", the CPU 101 determines from which direction key (only the up and down direction keys in the example in FIG. 7) the input has been made, and determines whether the linked button in the direction is currently displayed on the display device 104. At this time, the CPU 101 makes this decision by checking if the Y' coordinate Y'r of the upper leftmost position of the linked button in the direction lies in the range from Y'p to Y'p+Ye−1 (step S263).

With the Y'p1 page displayed on the display device 104 and the button 220 pointed to by the anchor 250 as shown in FIG. 7, for example, when the user's instructed direction is downward, the Y' coordinate Y'r of the upper leftmost position of the button 221 indicated by the down link of the button 220 lies in the range from Y'p(=Y'p1) to Y'p+Ye−1(Y'p2−1), so that the CPU 101 determines that the button 221 is currently displayed on the display device 104. With the Y'p1 page displayed on the display device 104 and the button 220 pointed to by the anchor 250 as shown in FIG. 7, when the user's instructed direction is upward, the Y' coordinate Y'r of the upper leftmost position of the button 219 indicated by the up link 308 of the button 220 does not lie in the range from Y'p (=Y'p1) to Y'p+Ye−1(Y'p2−1), so that the CPU 101 determines that the button 221 is not currently displayed on the display device 104.

When it is determined in step S263 that the linked button is not displayed on the display device 104, the flow proceeds to step S264. In step S264, the CPU 101 displays the menu screen 200B (Y'p page) on the display device 104 with the anchor 250 kept pointing to that button which is currently pointed to by the anchor 250. Thereafter, the main menu process is terminated, and the flow returns to the frame process in FIG. 4.

Even if the CPU 101 receives an instruction to move the position of the anchor 250 through a continuous input from any one of the up, down, right and left direction keys of the input device 103, the CPU 101 does not move the position of the anchor 250 at present. The movement of the position of the anchor 250 stops at the position of the button currently pointed to by the anchor 250. With the Y'p1 page displayed on the display device 104 and the upper end button 220 currently pointed to by the anchor 250 as shown in FIG. 7, for example, when there is a continuous input from the up direction key, the position of the anchor 250 does not move from the button 220 even if the manipulation of the up direction key by the user continues.

When it is determined in step S263 that the linked button is displayed on the display device 104, the flow proceeds to step S267.

When it is determined in step S260 that the value of the counter is "1", the CPU 101 determines from which direction key (only the up and down direction keys in the example in FIG. 7) the input has been made, and determines whether or not the linked button in the direction is currently displayed on the display device 104. At this time, the CPU 101 makes this decision by checking if the Yr coordinate Y'r of the upper leftmost position of the linked button in the direction lies in the range from Y'p to y'p+Ye−1 (step S265). If the linked button is not currently displayed on the display device 104, the button currently pointed to by the anchor 250 is the button at the end in the direction.

When it is determined that the linked button is not currently displayed on the display device 104 at step S265, the CPU 101 computes the value of new Y'p according to the instructed direction in such a way that the linked button of the button at the end in the direction is displayed on the display device 104. If the instructed direction is upward, the value of new y'p becomes Y'p−Ye+1, but when Y'p−Ye+1<Y'e, the value of new Y'p becomes 0. If the instructed direction is downward, the value of new Y'p becomes Y'p+Ye−1, but when Y'p+Ye−1>Y'e, the value of new Y'p becomes Y'e−Y'e+1 (step S266). When it is simply mentioned as "Y'p", the coordinate is what corresponds to the scroll reference point before the calculation of the value of new Y'p (before scrolling of the screen). Thereafter, the flow proceeds to step S267.

In step S267, the CPU 101 resets the anchor display flag 310 of the button currently pointed to by the anchor 250, and sets the anchor display flag 310 of that button to which the position of the anchor 250 is to move. The CPU 101 converts the coordinates of each pixel on the menu screen 200B in the X'-Y' coordinate system to the coordinates of the X-Y coordinate system of the display device 104 in such a way that Y'p becomes Y=0 of the display device 104. The CPU 101 moves the position of the anchor 250 to the button whose anchor display flag 310 is newly set, and displays the Y'p page on the display device 104 (step S268). Thereafter, the main menu process is terminated, and the flow returns to the frame process in FIG. 4.

When there is no input from any direction key in step S256, the CPU 101 clears the value of the counter (step S269). The CPU 101 then determines whether or not there is an input from the Set key on the input device 103 (step S270).

When there is no input from the Set key, the main menu process is terminated, and the flow returns to the frame process in FIG. 4. When there is an input from the Set key, the CPU 101 shifts control from the process in the flowchart in FIG. 4 to the status process indicated by the process link 303 for the button whose anchor display flag 310 is set. The CPU 101 resets the anchor display flags 310 of all the buttons (step S271). Thereafter, the main menu process is terminated, and the flow returns to the frame process in FIG. 4.

According to the second embodiment, as apparent from the foregoing description, in a case where the display content of the menu screen 200B does not fit in the display area of the display device 104 and the position of the anchor 250 moves to a button in a screen which is not currently displayed, the position of the anchor 250 stops even when a continuous input from a direction key is made. With the user keeps manipulating the down direction key, the screen is not scrolled according to the movement of the position of the anchor 250, so that the user can easily grasp the position of the button currently pointed to by the anchor 250, thereby improving the operability for the user.

When there is an initial input from the same direction key thereafter, the position of the anchor 250 moves from the button at the end to the linked button. As the end button is linked to a button in a screen which is not currently displayed, therefore, the screen to be displayed on the display device 104 is scrolled in such a way as to display the linked button of the end button. As the user can display a button which has not been displayed in the display area so far and can sequentially move the position of the anchor 250 from the end button to another button by manipulating a single direction key without significantly changing the manipulation method, the operability for the user is improved.

Whether or not the button currently pointed to by the anchor 250 is an end button, when there is a continuous input from a direction key, is determined by checking if another button indicted by the link information in the instructed direction of the currently pointed button lies in the display area. As the CPU 101 can determine whether the button of interest is an end button by performing a comparatively simple determination, such as comparison between the position of a linked button and the display area, thus making the processing load lighter.

With the anchor 250 pointing to an end button in the display area currently displayed, to move the anchor 250 to a linked button of the end button, the screen is scrolled by the size of the display device 104 in such a way that the linked button is positioned to an end in the display area in the direction opposite to the end button. Accordingly, the entire content of the display area is changed and multiple new buttons are displayed. The user can sequentially move the position of the anchor 250 among the buttons without frequently changing buttons to be displayed in the display area. This improves the operability for the user.

The present invention is not limited to the aforementioned first and second embodiments, and various modifications and changes is applicable. Exemplary modifications of the aforementioned embodiments applicable to the invention will now be explained.

In the first embodiment, the locations of the individual buttons 201 to 204 in the menu screen 200A are horizontally laid out side by side in a row with regularity, but are not limited to this as long as they are set at arbitrary locations in the menu screen 200A. For example, the locations of the individual buttons in the menu screen 200A may be vertically laid out in a line with regularity.

The locations of the individual buttons in the menu screen 200 may be laid out in a matrix having multiple columns and multiple rows. FIG. 9 is a diagram showing the menu screen 200C of the modification that the CPU 101 displays on the display device 104. Also in this modification, the memory device 102 stores button data 300 having the same configuration as that of the first embodiment in FIG. 3 for individual buttons to be displayed on a menu screen 200C.

In the button data 300 on the individual buttons displayed on the menu screen 200C, the right link 307 is set in such a way that the position of the anchor 250 goes around all buttons 205 to 216, like from a button 205 to a button 206, from a button 208 to a button 209, from a button 212 to a button 213, and from a button 216 to the button 205 according to an input from the right direction key of the input device 103.

On the menu screen 200C, the position of the anchor 250 may stop at each row at the button 2083, the button 212, and the button 216 according to a continuous input from the right direction key. The CPU 101 can determine whether or not the button currently pointed to by the anchor 250 is an end button by checking if a link movement direction (Xr-Xs), which can be calculated from the current X coordinate Xs and the X coordinate Xr of the link destination, matches with the user's instructed direction (plus if right, and negative if left).

In the menu screen 200C, the position of the anchor 250 may only stop at the button 216 displayed at the lower right corner of the display device 104. The CPU 101 can determine whether or not the button currently pointed to by the anchor 250 is an end button by checking if link movement directions ((Xr-Xs) and (Yr-Ys)), which can be calculated from the current coordinates (Xs, Ys) and coordinates (Xr, Yr) of the link destination match with the user's instructed direction (plus if it is rightward and downward, or minus if it is leftward and upward).

In the button data 300 on the individual buttons displayed on the menu screen 200C, the same is true for the left link 306 which is set in such a way that the position of the anchor 250 goes around all buttons 205 to 216 like from the button 208 to the button 207, from the button 205 to the button 212, from the button 209 to the button 216, and from the button 213 to the button 208, according to an input from the left direction key of the input device 103. In a case where the position of the anchor 250 is stopped with respect to each row, buttons at the ends of the rows are the button 205, the button 209, and the button 213. In a case where the position of the anchor 250 is stopped at only the lower left in the display area, the button at the end of the row is the button 213.

In the matrix of the individual buttons displayed on the display device 104, the row and the column may be reversed. The X coordinate of the aforementioned row may be replaced with the Y coordinate, and the aforementioned up direction may be replaced with the left direction, and the aforementioned down direction may be replaced with the right direction. In the matrix of the individual buttons displayed and laid out on the display device 104, the position of the anchor 250 may sequentially move on the row and the column in the instructed direction according to inputs from the up and downs right and left direction keys. The aforementioned row and column may be used in combination with each other.

The individual buttons displayed on the menu screen may be aligned in a rectangular frame comprising multiple rows and multiple columns. For example, if a rectangular frame comprises three rows and four columns, a case of the menu screen 200C shown in FIG. 9 without the button 210 and the button 211 corresponds to this. The memory device 102 stores button data 300 including link origins and link destinations in place of the links 306 to 309 for the individual buttons displayed on the menu screen 200C.

A link origin is a button ID which indicates a button (to be the origin of movement) pointed to by the anchor 250 before the position of the anchor 250 is moved to that button according to an input from a corresponding direction key. If the position of the anchor 250 moves from the button 205 to the button 206 when an input for the right direction is made, the link origin in the right direction of the button 206 is the button 205.

The right direction key of the input device 103 can be a clockwise key. In button data 300 on the individual buttons 205, 206, 207, 208, 212, 216, 215, 214, 213, and 209 aligned and displayed in a rectangular frame on the menu screen, a clockwise link is set in such a way that the position of the anchor 250 sequentially goes in the clockwise direction according to an input from the right direction key of the input device 103. A reverse direction link with the left direction key of the input device 103 in accordance with a counter clockwise key may be set in a similar way. In button data 300 on the individual buttons aligned in the rectangular frame displayed in the menu screen, when link destinations are set both clockwise (right direction key) and counterclockwise (left direction key) of the input device 103, a link origin in the right direction and a link origin in the left direction may be substituted by a link destination in the left direction, and a link destination in the right direction, respectively.

When the position of the anchor 250 is once stopped at any of the buttons displayed at the four corners of the menu screen (buttons 205, 208, 216, and 213), the CPU 101 determines whether or not the button currently pointed to by the anchor 250 is a button at any of the four corners by checking if either one of the X coordinate and the Y coordinate at the link destination has the same value as that at the link origin of the button currently pointed to by the anchor 250. If neither one of the X coordinate and the Y coordinate at the link destination has the same value as that at the link origin, the button currently pointed to by the anchor 250 is an end button.

When a continuous input from a direction key is made, the movement of the position of the anchor 250 is stopped at a button at one of the four corners. The position of the anchor 250 does not suddenly move to another straight line while the user continues input in the clockwise or the counterclockwise direction. The user can adequately figure out a straight line and a button where the anchor 250 is positioned, so that operability for the user improves. Even when the movement of the position of the anchor 250 once stops at a button at one of the four corners, as a direction key which is the same as that of the continuous input so far is manipulated again, and the position of the anchor 250 moves to the next straight line. The user can sequentially move the position of the anchor 250 from buttons at the ends to other buttons by manipulation of a single direction key, so that operability improves.

The button data 300 may not include a link origin, in a case where the position of the anchor 250 is once stopped at any one of the buttons at the four corners displayed on the menu screen (buttons 205, 208, 216, and 213). In this case, the CPU 101 can determine whether or not the button currently pointed to by the anchor 250 is a button at one of the four corners by checking if both the X coordinate and the Y coordinate of the position of the button currently pointed to by the anchor 250 are the largest among the X and Y coordinates of the positions of the buttons displayed on the menu screen, checking if both the X coordinate and the Y coordinate are the smallest, checking if the X coordinate is the largest and the Y coordinate is the smallest, or checking if the X coordinate is the smallest and the Y coordinate is the largest. If both the X coordinate and the Y coordinate of the position of the button of interest are the largest or the smallest, or if the X coordinate of the position of the button of interest is the largest and the Y coordinate thereof is the smallest, or if the X coordinate of the position of the button of interest is the smallest and the Y coordinate thereof is the largest, the button currently pointed to by the anchor 250 is an end button.

When the position of the anchor 250 is once stopped at a button at any of the two corners displayed on the menu screen (buttons 205 and 216), the CPU 101 may determine whether or not the button currently pointed to by the anchor 250 is a button at any of the two corners by checking if the X coordinate and the Y coordinate of the position of the button currently pointed to by the anchor 250 are both the largest among the X and Y coordinates of the positions of the buttons displayed on the menu screen, or checking if both the X coordinate and the Y coordinate are the smallest. If both the X coordinate and the Y coordinate of the position of the button of interest are the largest among the X and Y coordinates of the positions of the buttons displayed on the menu screen, or both the X coordinate and the Y coordinate of the position of the button of interest are the smallest, the button currently pointed to by the anchor 250 is an end button.

The individual buttons displayed on the menu screen may be arranged circularly. This may be a case where the buttons 210 and 211 are eliminated and the rectangular frame is changed to a circular shape on the menu screen 200C of the modification shown in FIG. 9. The button data 300 of each button includes buttons of the link origin and the link destination and an end button as information.

When the position of the anchor 250 is once stopped at the buttons at the ends among the buttons 205, 206, 207, 208, 212, 216, 215, 214, 213, and 209 displayed on the menu screen, the CPU 101 may determine whether or not the button currently pointed to by the anchor 250 is an end button by checking if end button data is included in the button data 300 of the button.

The CPU 101 may store end button information that indicates the button pointed to by the anchor when the input has started. The CPU 101 may determine whether or not the button pointed to by the anchor 250 is an end button by checking end button information. In this case, the position of the anchor 250 is stopped at that button indicated by the end information, when a continuous input is made. That is, the position of the anchor 250 is stopped after going around all of the buttons. The button data 300 need not include an end button data.

The CPU 101 may determine whether or not the button currently pointed to by the anchor 250 is an end button by checking if the X coordinate of the button position is the largest or the smallest among the X coordinates of the positions of the buttons displayed on the menu screen, and checking if the Y coordinate of the button position is the largest or the smallest. If the X coordinate of the button position is the largest or the smallest among the X coordinates of the positions of the buttons displayed on the menu screen, or the Y coordinate of the button position is the largest or the smallest, the button currently pointed to by the anchor 250 may be an end button. In this case, the position of the anchor 250 is once stopped at any end button at the uppermost end, the lowermost end, the rightmost end and the leftmost end among the buttons 205, 206, 207, 208, 212, 216, 215, 214, 213, and 209 circularly displayed on the menu screen, even if the button data 300 does not include end button data.

The button data 300 may not include end button data, but may include information that indicates a condition of an end button. For example, if the registered condition of an end button is such that a button located at the position with the smallest Y coordinate is an end button, when the position of the anchor 250 is once stopped at an end button among the buttons 205, 206, 207, 208, 212, 216, 215, 214, 213, and 209 circularly displayed on the menu screen, the CPU 101 may determine whether or not the button currently pointed to by the anchor 250 is an end button by checking if the Y coordinate of the button position is the smallest among the Y coordinates of the positions of the buttons displayed on the menu screen. If the Y coordinate of the button position is the smallest among the Y coordinates of the positions of the buttons displayed on the menu screen, the button currently pointed to by the anchor 250 may be an end button.

The individual buttons displayed on the menu screen may be aligned in a polygonal frame with sides each having buttons aligned thereon. The memory device 102 stores the button data 300 including the link origin and the link destination for each button displayed on the menu screen. The CPU 101 can determine whether or not the button currently pointed to by the anchor 250 is an end button by checking if the position of the linked button is located on a straight line linking the position of the button of the link origin to the position of the button currently pointed to by the anchor 250. The CPU 101 can determine whether or not the button currently pointed to by the anchor 250 is an end button by the same method of determining an end button among the circularly aligned buttons.

In the second embodiment, for buttons 219 to 224 included in the menu screen 200B, the process is executed based on the coordinates (X's, Y's) of the button currently pointed to by the anchor 250 and the coordinates (X'r, Y'r) of a linked button with the coordinates in the X'-Y' coordinate system, which is the coordinate system set on the menu screen 200B, as reference coordinates. However, the process may be executed with coordinates in the X'-Y' coordinate system of the menu screen 200B being transformed into coordinates in the X-Y coordinate system of the display device 104.

The coordinates of at least the upper leftmost position of each button on the menu screen 200B in the X'-Y' coordinate system are transformed into coordinates in the X-Y coordinate system of the display device 104. The CPU 101 determines whether or not the button currently pointed to by the anchor 250 is an end button in the instructed direction by checking if the coordinates (Xr, Yr) of a linked button in that direction lies within the coordinate range of $0 \leq Xr \leq Xe-1$, $0 \leq Yr \leq Ye-1$.

While only the menu screen 200C which can be scrolled up and down has been considered in the second embodiment, the invention is not limited to this particular configuration. The screen may be scrolled right and left. Alternatively, the screen may be scrolled both up and down, and right and left.

In the second embodiment, in a case where an initial input in any direction is made when a button at an end in that direction is pointed to by the anchor 250 on the Yp page displayed on the display device 104) the CPU 101 scrolls the screen by the size of the display device 104 in the Y direction. However, the scrolling is not so limited, as long as a button which is the link destination of the end button can be displayed on the display device 104, and the screen may be scrolled by an arbitrary size.

The CPU 101 determining Yp according to the instructed direction in such a way that the button which is the link destination of an end button is displayed in step S266 in the second embodiment, is not limiting; for example, candidates of the scroll reference point may be prestored in the memory device 102. In this case, the candidates of the scroll reference point of the screen may be set not according to the size of the display device 104 but according to the viewability of the display device 104 for the user. In the processes of steps S252 and S266, the CPU 101 selects any scroll reference point from candidates of the preset scroll reference point.

Although the button data 300 of each button includes the left link 306, the right link 307, the upward link 308, and the downward link 309 in the first and second embodiments, such button data is not intended to be limiting. The button data 300 may include one or more links in ally of the up and down, and right and left directions in the first embodiment, and two or more of such links in the second embodiment.

There may be a button whose link destination in a direction for an initial input is set but whose link destination in the same direction for a continuous input is not. Even when a continuous input in such a direction is made, the position of the anchor 250 stops at the button. When an initial input is made again after the position of the anchor 250 stops at that button, the position of the anchor 250 shifts to the linked button that is the link destination for the initial input.

In the first and second embodiments, the CPU 101 determines how long a continuous input continues based on the value of the counter which starts counting at an initial input and takes the value of the counter for determination as a predetermined value (e.g., 15, . . . , 25+5K (K being an integer larger than or equal to 0)). However, the embodiments are not limited to this particular case, but the interval may be a constant value (e.g., 15K), or may be shortened by an interval of a predetermined value (e.g., 15, 20, 25, 30, 32, . . . ).

The CPU 101 determines how long a continuous input continues based on the value of the counter which starts counting at an initial input in the first and second embodiments, which are not limited to this particular case. For example, pulse generators which generate different pulses for an initial input and a continuous input may be provided.

In this case, when receiving an initial input, the CPU 101 generates a pulse 1 from a pulse generator 1. The pulse generator 1 then stands by for reception of a new input. In contrast, a pulse generator 2 which recognizes the generation of the pulse 1 generates a pulse 2 every 0.2 second, by the generation of which the CPU 101 determines that a continuous input continues. The pulse generator 2 stops generating the pulse 2 when no further continuous input is made, and stands by for generation of the next pulse 1. The CPU 101 can determine whether an input instruction at the current timing is an initial input or a continuous input according to which one of the pulse generators 1 and 2 generates a pulse.

The CPU 101 has the counter whose value is updated by generation of a pulse, and determines whether an input is an initial input or not, and how long a continuous input continues based on the value of that counter in the first and second embodiments. However, the above embodiments are intended to be non-limiting. Such a counter may be constituted as the CPU 101 updates the value of a predetermined area in the memory device 102 upon each timer interruption every 1/30 second.

In the first and second embodiments, the input device 103 has four direction keys for inputting up, down, right, and left directions. The input device 103 necessary for making a directional input, however, is not limited to this configuration, but a joystick, a mouse, a trackball or the like may be used instead.

In the first and second embodiments, the buttons displayed on the menu screens 200A, 200B have a unified rectangular shape. The button, however, is not limited to this shape, and may have an arbitrary shape, such as a circular shape, an oval shape, or a polygonal shape other than a rectangular shape. In a case where a button of a circular shape is used, for example, the button data 300 should store the central position of the button in place of the upper left position 304, and the radius of the button instead of the button size 305. The button shape may differ button by button.

In the first and second embodiments, the entire display area of the display device 104 is taken as the display area of the menu screen. However, the display style of the menu screen is not limited to this type, and the menu screen may be displayed in a part of the display area of the display device 104 in a window style.

The foregoing description of the first and second embodiments of the invention has been given, as an example, of a case where the position of the anchor 250 is moved among the buttons on the menu screen 200A, 200B in the information processing device 100 and the screen is scrolled as needed. However, the invention is not limited to application to the information processing device 100, and is applicable to screens which are displayed on a game device, a general-purpose personal computer, a digital home appliance, a cellular phone, a car navigation system and the like. Information displayed in a scroll area in a scrolling manner may be of any type which is selected according to a hardware device and the kind of a process.

A program and data for the information processing unit 100 are stored in the memory device 102, and the program is run by the CPU 101 in the first and second embodiments. The invention is not limited to this case. A program and data may be stored in a memory medium, distributed in this fashion, and transferred to the memory device 102 from the memory medium, so that the program is run by the CPU 101. Any available memory medium, such as a DVD or a semiconductor memory card, may be used in accordance with the kind of hardware device to which the invention is applied. A program and data may be stored in a memory medium, distributed in this fashion, and transferred to an HDD and a RAM as needed, so that the program is run by the CPU 101.

In a case where the invention is applied to an information processing device having a function capable of connecting to the Internet as a hardware device, a program and data may be stored in a server device present on the Internet, and distributed to the information processing device over the Internet. In a case where the invention is applied to a cellular phone as a hardware device, for example, the cellular phone generally has a function capable of connecting to the Internet, but does not have a device which reads out information from a memory medium. A program and data can be distributed to the cellular phone from the server device having a fixed disk device storing that program and data over the Internet.

Although the invention has been described with reference to several exemplary embodiments, it is understood that the words that have been used are words of description and illustration, rather than words of limitation. Changes may be made within the purview or the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. An information processing apparatus that displays a plurality of selectable objects associated with processes to be selectively executed by a user on a display device, and that enables selection of a selectable object corresponding to a process desired by the user among the plurality of selectable objects by sequentially moving a pointer to a position corresponding to each of the plurality of selectable objects displayed on the display device according to a user operation, the information processing apparatus comprising:

a selectable object storage unit that stores link information indicating a selectable object to which a pointer position is to be moved in accordance with the user operation, for each of the plurality of selectable objects, when the pointer is positioned thereat;

a selectable object display unit that arranges all of the plurality of selectable objects whose link information is stored by the selectable object storage unit in a plurality of rows and columns in an order according to the link information included in each selectable object and that displays plurality of the selectable objects in a display area set on the display device;

a movement operation detecting unit that detects whether a movement operating unit that inputs an instruction for moving the pointer position in the display area according to the user operation is operated;

a pointer moving unit that moves the pointer position in accordance with the link information of a selectable object corresponding to a current pointer position, when a movement operation detecting unit detects an operation of the movement operating unit;

a set operation detecting unit that detects whether a set operating unit for inputting, according to the user operation, an instruction for selecting the selectable object corresponding to the current pointer position and for executing a process associated with the selected selectable object is operated; and a selection process executing unit that executes the process associated with the selectable object corresponding to the pointer position, when the set operation detecting unit detects an operation of the set operating unit, wherein the movement operation detecting unit comprises:

an initial operation detecting unit that detects whether the user initially operates the movement operating unit; and a continuous operation detecting unit that detects whether the movement operating unit is continuously operated, after the initial operation detecting unit detects that the user operates the movement operating unit, wherein the pointer moving unit comprises:

an initial time pointer moving unit that moves the pointer to a position corresponding to another selectable object indicated by the link information of the selectable object corresponding to the current pointer position in accordance with a detected operation of the movement operating unit, when the initial operation detecting unit detects the operation of the movement operating unit;

an end determining unit that determines whether the selectable object corresponding to the current pointer position is displayed at an end of the display area among the selectable objects displayed therein, when the continuous operation detecting unit detects a continuous operation of the movement operating unit;

a continuous time pointer moving unit that moves the pointer to the position corresponding to another selectable object indicated by the link information of the selectable object corresponding to the current pointer position in accordance with a detected continuous operation of the movement operating unit, when the end determining unit determines that the selectable object corresponding thereto is not displayed at the end of the display area; and a continuous time pointer stopping unit that stops the pointer without moving from the current pointer position, when the end determining unit determines that the selectable object corresponding thereto is displayed at the end of the display area, wherein the selectable object storage unit stores link information that instructs the pointer to move through each of the plurality of selectable objects, and move from a selectable object positioned at one end in a row to a selectable object positioned at the other end in a different row according to the user operation;

wherein when the initial time operation detecting unit detects an operation of the movement operating unit corresponding to a direction outside of the end at which the pointer is positioned in the display area, and when the pointer is currently positioned at a position corresponding to the selectable object displayed at one end of the display area, the initial time pointer moving unit moves the pointer to a position corresponding to a selectable object displayed at the other end of the display area in accordance with link information of a selectable object displayed at the one end; and wherein the end determining unit determines that the selectable object corresponding to the current pointer position is displayed at the end of the display area, when a direction from the current pointer position or a position of the selectable object corresponding thereto toward that of another selectable object indicated by the link information of the selectable object corresponding thereto is opposite in row and column directions to a direction of a detected continuous operation, when the continuous operation detecting unit detects the continuous operation of the movement operating unit.

2. The information processing apparatus according to claim 1, wherein the selectable object storage unit stores forward direction link information indicating a selectable object to which the pointer position is to be moved in a forward direction in accordance with an operation of the forward direction by the user, and stores reverse direction link information indicating a selectable object to which the pointer position is to be moved in a reverse direction in accordance with an operation of the reverse direction by the user, for each of the plurality of selectable objects;

wherein the movement operating unit comprises a forward direction operating unit for inputting an instruction for moving the pointer position in the forward direction and a reverse direction operating unit that inputs an instruction for moving the pointer position in the reverse direction;

wherein the pointer moving unit moves the pointer position in accordance with link information according to a direction which corresponds to either the forward direction operating unit or the reverse direction operating unit detected by the movement operation detecting unit; and wherein the end determining unit determines that the selectable object corresponding to the current pointer position is displayed at the end, when the continuous operation detecting unit detects the operation of the movement operating unit corresponding to the direction outside of the end at which the pointer is positioned in the display area, when the pointer is currently positioned at the position corresponding to the selectable object displayed at one end of the display area.

3. An information processing apparatus that displays a plurality of selectable objects associated with processes to be selectively executed by a user on a display device, and that enables selection of a selectable object corresponding to a process desired by the user among the plurality of selectable objects by sequentially moving a pointer to a position corresponding to each of the plurality of selectable objects displayed on the display device according to a user operation, the information processing apparatus comprising:

a selectable object storage unit that stores link information indicating a selectable object to which a pointer position is to be moved in accordance with the user operation, for each of the plurality of selectable objects, when the pointer is positioned thereat;

a selectable object display unit that arranges all of the plurality of selectable objects whose link information is stored by the selectable object storage unit in a rectangular frame in an order according to the link information included in each selectable object and for displaying the plurality of selectable objects in a display area set on the display device;

a movement operation detecting unit that detects whether a movement operating unit for inputting an instruction for moving the pointer position in the display area according to the user operation is operated;

a pointer moving unit that moves the pointer position in accordance with the link information of a selectable object corresponding to a current pointer position, when the movement operation detecting unit detects an operation of the movement operating unit;

a set operation detecting unit that detects whether a set operating unit for inputting, according to the user operation, an instruction for selecting the selectable object corresponding to the current pointer position and for executing a process associated with the selected selectable object is operated; and a selection process executing unit that executes the process associated with the selectable object corresponding to the pointer position, when the set operation detecting unit detects an operation of the set operating unit, wherein the movement operation detecting unit comprises:

an initial operation detecting unit that detects whether the user initially operates the movement operating unit; and a continuous operation detecting unit that detects whether the movement operating unit is continuously operated, after the initial operation detecting unit detects that the user operates the movement operating unit, wherein the pointer moving unit comprises:

an initial time pointer moving unit that moves the pointer to a position corresponding to another selectable object indicated by the link information of the selectable object corresponding to the current pointer position in accordance with a detected operation of the movement operating unit, when the initial operation detecting unit detects the operation of the movement operating;

an end determining unit that determines whether the selectable object corresponding to the current pointer position is displayed at an end of the display area among the selectable objects displayed therein, when the continuous operation detecting unit detects a continuous operation of the movement operating unit;

a continuous time pointer moving unit that moves the pointer to the position corresponding to another selectable object indicated by the link information of the selectable object corresponding to the current pointer position in accordance with a detected continuous operation of the movement operating unit, when the end determining unit determines that the selectable object corresponding thereto is not displayed at the end of the display area; and a continuous time pointer stopping unit that stops the pointer without moving from the current pointer position, when the end determining unit determines that the selectable object corresponding thereto is displayed at the end of the display area, wherein the selectable object storage unit stores link information that instructs the pointer to move through each of the plurality of selectable objects in the rectangular frame;

wherein the initial time pointer moving unit moves the pointer position in accordance with link information of a selectable object displayed at any one of the four corners of the rectangular frame, when the initial time operation detecting unit detects the operation of the movement operating unit, and when the pointer is currently positioned thereat; and wherein the end determining unit determines that the selectable object corresponding to the current pointer position is displayed at the end of the display area, when a position of the selectable object corresponding thereto is different from that of another selectable object indicated by the link information of the selectable object corresponding thereto in row and colunm directions of the rectangular frame, when the continuous operation detecting unit detects the continuous operation of the movement operating unit.

4. The information processing apparatus according to claim 3;

wherein the selectable object storage unit stores forward direction link information indicating a selectable object to which the pointer position is to be moved in a forward direction in accordance with an operation of the forward direction by the user, and stores reverse direction link information indicating a selectable object to which the pointer position is to be moved in a reverse direction in accordance with an operation of the reverse direction by the user, for each of the plurality of selectable objects;

wherein the movement operating unit comprises forward direction operating unit for inputting an instruction for moving the pointer position in the forward direction and reverse direction operating unit for inputting that inputs an instruction for moving the pointer position in the reverse direction;

wherein the pointer moving unit moves the pointer position in accordance with link information according to a direction which corresponds to either the forward direction operating unit or the reverse direction operating unit detected by the movement operation detecting unit; and wherein the end determining unit determines that the selectable object corresponding to the current pointer position is displayed at the end, when the continuous operation detecting unit detects the operation of the movement operating unit corresponding to the direction outside of the end at which the pointer is positioned in the display area, when the pointer is currently positioned at the position corresponding to the selectable object displayed at one end of the display area.

5. A pointer moving display method which is executed by a processing apparatus of a computer apparatus, the computer apparatus comprising a display device that displays a plurality of selectable objects associated with processes to be selectively executed by a user, a storage device that stores link information indicating a selectable object to which a pointer position is to be moved in accordance with a user operation when a pointer is positioned at each of the plurality of selectable objects, an input device for inputting a movement instruction that moves the pointer to a position corresponding to each of the plurality of selectable objects displayed on the display device and a set instruction that jumps to a process associated with a selectable object corresponding to the pointer position, the pointer moving display method comprising:

arranging all of the plurality of selectable objects whose link information is stored by the storage device in a plurality of rows and columns in an order according to the link information included in each selectable object and displaying the plurality of selectable objects in a display area set on the display device;

determining whether an operation of the input device according to the movement instruction for moving the pointer position in the display area is initially detected;

moving the pointer to a position corresponding to another selectable object indicated by the link information, which is stored in the storage device, for a selectable object corresponding to a current pointer position in accordance with a detected operation of the movement instruction and displaying, on the display device, when it is determined that the operation of the movement instruction is initially detected;

determining whether the operation of the input device according to the movement instruction is continuously detected, after it is determined that an initial operation of the input device is detected;

determining whether the selectable object corresponding to the current pointer position is displayed at an end of the display area among the selectable objects displayed in the display area of the display device, when it is determined that the operation of the input device according to the movement instruction is continuously detected;

moving the pointer to the position corresponding to another selectable object indicated by the link information, which is stored in the storage device, for the selectable object corresponding to the current pointer position in accordance with the detected operation according to the movement instruction and displaying on the display device, when it is determined that the selectable object corresponding thereto is not displayed at the end of the display area;

displaying the pointer position on the display device without moving from the current pointer position, in spite of the detected operation according to the movement instruction, when it is determined that the selectable object corresponding thereto is displayed at the end of the display area;

determining whether the operation of the input device according to the set instruction for selecting the selectable object corresponding to the current pointer position and for executing the operation associated with the selected selectable object is detected; and jumping to the operation associated with the selectable object corresponding to the pointer position, when it is determined that the operation according to the set instruction is detected, wherein the link information instructs the pointer to move through each of the plurality of selectable objects, and to move from a selectable object positioned at one end in a row to a selectable object positioned at the other end in a different row according to the user operation;

wherein, when an operation corresponding to a direction outside of the end at which the pointer is positioned in the display area is initially detected, when the pointer is currently positioned at a position corresponding to the selectable object displayed at one end of the display area, the moving of the pointer position, when it is determined that the operation according to the movement instruction is initially detected, comprises moving the pointer to a position corresponding to a selectable object displayed at the other end of the display area in accordance with link information of a selectable object displayed at the one end of the display area; and wherein the determining of whether the selectable object corresponding to the current pointer position is displayed at the end of the display area, comprises determining that the selectable object corresponding thereto is displayed at the end of the display area, when a direction from the current pointer position or a position of the selectable object corresponding thereto toward that of another selectable object indicated by the link information of the selectable object corresponding thereto is opposite in row and column directions to a direction of the detected operation, when it is determined that the operation of the movement instruction is continuously detected.

6. A method which is executed by a processing apparatus of a computer apparatus, the computer apparatus comprising a display device that displays a plurality of selectable objects associated with processes to be selectively executed by a user, a storage device that stores link information indicating a selectable object to which a pointer position is to be moved in accordance with a user operation when a pointer is positioned at each of the plurality of selectable objects, an input device that inputs a movement instruction for moving the pointer to a position corresponding to each of the plurality of selectable objects displayed on the display device and a set instruction that jumps to a process associated with a selectable object corresponding to the pointer position, the method comprising:

arranging all of the plurality of selectable objects whose link information is stored by the storage device in a rectangular frame in an order according to the link information included in each selectable object and displaying the plurality of selectable objects in a display area set on the display device;

determining whether an operation of the input device according to the movement instruction for moving the pointer position in the display area is initially detected;

moving the pointer to a position corresponding to another selectable object indicated by the link information, which is stored in the storage device, for a selectable object corresponding to a current pointer position in accordance with a detected operation according to the movement instruction and displaying on the display device, when it is determined that the operation according to the movement instruction is initially detected;

determining whether the operation of the input device according to the movement instruction is continuously detected, after it is determined that an initial operation of the input device is detected;

determining whether the selectable object corresponding to the current pointer position is displayed at an end of the display area among the selectable objects displayed in the display area of the display device, when it is determined that the operation of the input device according to the movement instruction is continuously detected;

moving the pointer to the position corresponding to another selectable object indicated by the link information, which is stored in the storage device, for the selectable object corresponding to the current pointer position in accordance with the detected operation according to the movement instruction and displaying on the display device, when it is determined that the selectable object corresponding thereto is not displayed at the end of the display area;

displaying the pointer position on the display device without moving from the current pointer position, in spite of the detected operation according to the movement instruction, when it is determined that the selectable object corresponding thereto is displayed at the end of the display area;

determining whether the operation of the input device according to the set instruction for selecting the selectable object corresponding to the current pointer position and for executing the operation associated with the selected selectable object is detected; and jumping to the operation associated with the selectable object corresponding to the pointer position, when it is determined that the operation according to the set instruction is detected, wherein the link information instructs the pointer to move through each of the plurality of selectable objects in the rectangular frame;

wherein the moving of the pointer position, when it is determined that the operation according to the movement instruction is initially detected, comprises moving the pointer position in accordance with link information of a selectable object displayed at any one of the four corners of the rectangular frame, when an operation of the movement instruction is initially detected, and when the pointer is currently positioned thereat; and wherein the determining of whether the selectable object corresponding to the current pointer position is displayed at the end of the display area comprises determining that the selectable object corresponding thereto is displayed at the end of the display area, when a position of the selectable object corresponding thereto is different from that of another selectable object indicated by the link information of the selectable object corresponding thereto in row and column directions of the rectangular frame, and when it is determined that the operation of the movement instruction is continuously detected.

7. A computer-readable storage medium on which a program is stored, the program executed by a processing apparatus of a computer apparatus, the computer apparatus comprising:

a display device that displays a plurality of selectable objects associated with processes to be selectively executed by a user, a storage device that stores link information indicating a selectable object to which a pointer position is to be moved in accordance with a user operation when a pointer is positioned at each of the plurality of selectable objects, an input device that inputs a movement instruction for moving the pointer to a position corresponding to each of the plurality of selectable objects displayed on the display device, and a set instruction that jumps to a process associated with a selectable object corresponding to the pointer position, the computer readable storage medium comprising:

an arranging code segment that arranges all of the plurality of selectable objects whose link information is stored by the storage device in a plurality of rows and columns in an order according to the link information included in each selectable object and displaying the plurality of selectable objects in a display area set on the display device;

a first determining code segment that determines whether an operation of the input device according to the movement instruction for moving the pointer position in the display area is initially detected;

a first moving code segment that moves the pointer to a position corresponding to another selectable object indicated by the link information, which is stored in the storage device, for a selectable object corresponding to a current pointer position in accordance with a detected operation of the movement instruction and display on the display device, when it is determined that the operation of the movement instruction is initially detected;

a second determining code segment that determines whether the operation of the input device according to the movement instruction is continuously detected, after it is determined that an initial operation of the input device is detected;

a third determining code segment that determines whether the selectable object corresponding to the current pointer position is displayed at an end of the display area among the selectable objects displayed in the display area of the display device, when it is determined that the operation of the input device according to the movement instruction is continuously detected;

a second moving code segment that moves the pointer to the position corresponding to another selectable object indicated by the link information, which is stored in the storage device, for the selectable object corresponding to the current pointer position in accordance with the detected operation according to the movement instruction and displaying on the display device, when it is determined that the selectable object corresponding thereto is not displayed at the end of the display area;

a displaying code segment that displays the pointer position on the display device without moving from the current pointer position, in spite of the detected operation according to the movement instruction, when it is determined that the selectable object corresponding thereto is displayed at the end of the display area;

a fourth determining code segment that determines whether the operation of the input device according to the set instruction for selecting the selectable object corresponding to the current pointer position and for executing the operation associated with the selected selectable object is detected; and a jumping code segment that jumps to the operation associated with the selectable object corresponding to the pointer position, when it is determined that the operation according to the set instruction is detected, wherein the link information instructs the pointer is to move through each of the plurality of selectable objects, and move from a selectable object positioned at one end in a row to a selectable object positioned at the other end in a different row according to the user operation;

wherein when an operation corresponding to a direction outside of the end at which the pointer is positioned in the display area is initially detected, and when the pointer is currently positioned at a position corresponding to the selectable object displayed at one end of the display area, the first moving code segment moves the pointer to a position corresponding to a selectable object displayed at the other end of the display area in accordance with link information of a selectable object displayed at the one end; and wherein the third determining code segment further determines that the selectable object corresponding thereto is displayed at the end of the display area, when a direction from the current pointer position or a position of the selectable object corresponding thereto toward that of another selectable object indicated by the link information of the selectable object corresponding thereto is opposite in row and column directions to a direction of the detected operation, and when it is determined that the operation of the movement instruction is continuously detected.

8. A computer-readable storage medium on which a program is stored, the program being executed by a processing apparatus of a computer apparatus, the computer apparatus comprising:

a display device for displaying a plurality of selectable objects associated with processes to be selectively executed by a user, a storage device that stores link information indicating a selectable object to which a pointer position is to be moved in accordance with a user operation when a pointer is positioned at each of the plurality of selectable objects, an input device that inputs a movement instruction that moves the pointer to a position corresponding to each of the plurality of selectable objects displayed on the display device, and a set instruction that jumps to a process associated with a selectable object corresponding to the pointer position, the computer readable storage medium comprising:

an arranging code segment that arranges all of the plurality of selectable objects whose link information is stored by the storage device in a rectangular frame in an order according to the link information included in each selectable object and displaying the plurality of selectable objects in a display area set on the display device;

a first determining code segment that determines whether an operation of the input device according to the movement instruction for moving the pointer position in the display area is initially detected;

a first moving code segment that moves the pointer to a position corresponding to another selectable object indicated by the link information, which is stored in the storage device, for a selectable object corresponding to a current pointer position in accordance with a detected operation of the movement instruction and displaying on the display device, when it is determined that the operation of the movement instruction is initially detected;

a second determining code segment that determines whether the operation of the input device according to the movement instruction is continuously detected, after it is determined that an initial operation of the input device is detected;

a third determining code segment that determines whether the selectable object corresponding to the current pointer position is displayed at an end of the display area among the selectable objects displayed in the display area of the display device, when it is determined that the operation of the input device according to the movement instruction is continuously detected;

a second moving code segment that moves the pointer to the position corresponding to another selectable object indicated by the link information, which is stored in the storage device, for the selectable object corresponding to the current pointer position in accordance with the detected operation according to the movement instruction and displaying on the display device, when it is determined that the selectable object corresponding thereto is not displayed at the end of the display area;

a displaying code segment that displays the pointer position on the display device without moving from the current pointer position, in spite of the detected operation according to the movement instruction, when it is determined that the selectable object corresponding thereto is displayed at the end of the display area;

a fourth determining code segment that determines whether the operation of the input device according to the set instruction for selecting the selectable object corresponding to the current pointer position and for executing the operation associated with the selected selectable object is detected; and a jumping code segment that jumps to the operation associated with the selectable object corresponding to the pointer position, when it is determined that the operation according to the set instruction is detected, wherein the link information instructs the pointer to move through each of the plurality of selectable objects in the rectangular frame;

wherein the moving code segment moves the pointer position in accordance with link information of a selectable object displayed at any one of the four corners of the rectangular frame, when the operation of the movement instruction is initially detected, and when the pointer is currently positioned thereat; and wherein the third determining code segment determines that the selectable object corresponding thereto is displayed at the end of the display area, when a position of the selectable object corresponding thereto is different from that of another selectable object indicated by the link information of the selectable object corresponding thereto in row and column directions of the rectangular frame, and when it is determined that the operation of the movement instruction is continuously detected.

* * * * *

UNITED STATES PATENT AND TRADEMARK OFFICE
CERTIFICATE OF CORRECTION

PATENT NO. : 7,574,678 B2  Page 1 of 1
APPLICATION NO. : 11/420155
DATED : August 11, 2009
INVENTOR(S) : K. Maehiro et al.

It is certified that error appears in the above-identified patent and that said Letters Patent is hereby corrected as shown below:

At Column 35, line 65 (claim 7, line 75)
delete "is" before the word "to".

Signed and Sealed this

Nineteenth Day of January, 2010

David J. Kappos
*Director of the United States Patent and Trademark Office*